US008612372B2

(12) United States Patent
Gotoh et al.

(10) Patent No.: US 8,612,372 B2
(45) Date of Patent: Dec. 17, 2013

(54) DETECTION RULE-GENERATING FACILITY

(75) Inventors: Yasuhisa Gotoh, Kanagawa-ken (JP);
Yuhsuke Kaneyasu, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 1111 days.

(21) Appl. No.: 12/479,058

(22) Filed: Jun. 5, 2009

(65) Prior Publication Data
US 2010/0057667 A1 Mar. 4, 2010

(30) Foreign Application Priority Data

Aug. 29, 2008 (JP) ................... 2008-221142

(51) Int. Cl.
*G06N 5/02* (2006.01)
*G06N 5/04* (2006.01)

(52) U.S. Cl.
USPC ................... 706/16; 706/46; 706/47; 706/59

(58) Field of Classification Search
USPC .......................................................... 706/16
See application file for complete search history.

(56) References Cited

U.S. PATENT DOCUMENTS

| 7,433,855 B2 * | 10/2008 | Gavan et al. | 706/47 |
| 2005/0086538 A1 * | 4/2005 | Kubota | 713/201 |

FOREIGN PATENT DOCUMENTS

| JP | 2008-292902 | 11/1996 |
| JP | 2001005692 A1 | 1/2001 |
| JP | 2005316728 A1 | 11/2005 |
| JP | 2007257184 A1 | 10/2007 |
| JP | 2008-033725 | 2/2008 |
| JP | 2008-041041 | 2/2008 |
| JP | 2008041041 A | 2/2008 |
| JP | 2008065688 A1 | 3/2008 |

OTHER PUBLICATIONS

Gujrati et al., A Meta-Learning Failure Predictor for Blue Gene/L Systems [online], 2007 [retrieved on Jan. 24, 2012]. Retrieved from the Internet:< URL: http://ieeexplore.ieee.org/xpls/abs_all.jsp?arnumber=4343847&tag=1>.*

* cited by examiner

*Primary Examiner* — Jeffrey A Gaffin
*Assistant Examiner* — Nathan Brown, Jr.
(74) *Attorney, Agent, or Firm* — Nelson and Nelson; Daniel P. Nelson; Alexis V. Nelson

(57) ABSTRACT

An apparatus for generating event detection rules in a multiple-component computer system in accordance with embodiments of the invention may include a configuration information-extracting section for acquiring system configuration information from a multiple-component computer system. The system configuration information may include related information that describes relationships among system components. The apparatus may further include a history information-collecting section for collecting history information from the multiple-component computer system, such as log information and/or failure information output from a component upon a system failure. A candidate event-identifying section may identify candidate events that may be selected by a user to generate a detection rule based on the system configuration information and the history information. Finally, a candidate event-presenting section may present the candidate events to a user for selection.

19 Claims, 24 Drawing Sheets

(a)

DETECTION RULE-GENERATING FACILITY

BACKGROUND

Computer systems form an integral part of social infrastructure systems. Maintaining proper social infrastructure operation, however, requires considerable operation costs. Recently, autonomic computing systems have attracted attention as a technique for reducing operation costs while increasing system stability.

"Autonomic computing system" is a generic term describing all major areas of technology for constructing a system-scale, self-managing environment. Generally, such a system aims to detect a problem or failure in the system and autonomously eliminate the same.

SUMMARY

Embodiments of the invention have been developed to generate event detection rules in a multiple-component computer system.

In accordance with certain embodiments of the invention, an apparatus for generating event detection rules in a multiple-component computer system may include a configuration information-extracting section for acquiring system configuration information from a multiple-component computer system. The system configuration information may include related information that describes relationships among system components. The apparatus may further include a history information-collecting section for collecting history information from the multiple-component computer system, such as log information and/or failure information output from a component upon a system failure. A candidate event-identifying section may identify candidate events that may be selected by a user to generate a detection rule based on the system configuration information and the history information. Finally, a candidate event-presenting section may present the candidate events to a user for selection.

A corresponding method and computer program product are also disclosed and claimed herein.

BRIEF DESCRIPTION OF THE DRAWINGS

In order that the advantages of the disclosure will be readily understood, a more particular description of embodiments of the invention briefly described above will be rendered by reference to specific embodiments illustrated in the appended drawings. Understanding that these drawings depict only typical embodiments of the invention and are not therefore to be considered limiting of its scope, embodiments of the invention will be described and explained with additional specificity and detail through use of the accompanying drawings, in which.

DETAILED DESCRIPTION OF THE INVENTION

Figure 1:
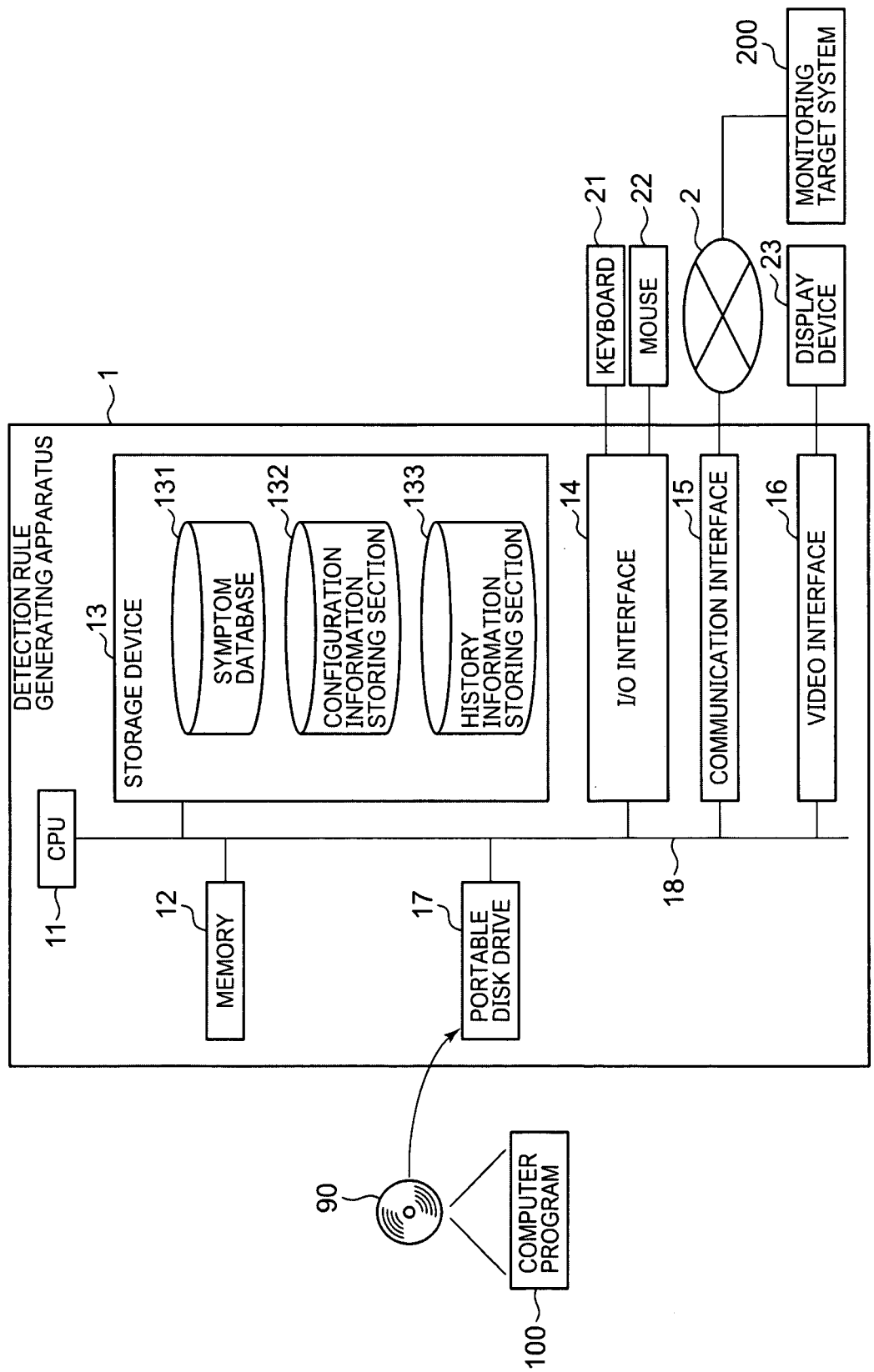
FIG. 1 is a block diagram of one embodiment of a detection rule-generating apparatus in accordance with the invention.

It will be readily understood that the components of the embodiments of the invention, as generally described and illustrated in the Figures herein, could be arranged and designed in a wide variety of different configurations. Thus, the following more detailed description of the embodiments of the invention, as represented in the Figures, is not intended to limit the scope of the claims, but is merely representative of certain examples of presently contemplated embodiments in accordance with the invention. The presently described embodiments will be best understood by reference to the drawings, wherein like parts are designated by like numerals throughout.

As will be appreciated by one skilled in the art, embodiments of the invention may be embodied as an apparatus, method, or computer program product. Furthermore, the present invention may take the form of an entirely hardware embodiment, an entirely software embodiment (including firmware, resident software, micro-code, etc.) or an embodiment combining software and hardware elements. Hardware and/or software elements provided to perform various tasks may be generally referred to herein as "modules." Furthermore, the present invention may take the form of a computer program product embodied in any tangible medium of expression having computer-usable program code embodied in the medium.

Any combination of one or more computer-usable or computer-readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory ("RAM"), a read-only memory ("ROM"), an erasable programmable read-only memory ("EPROM" or Flash memory), an optical fiber, a portable compact disc read-only memory ("CDROM"), an optical storage device, transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer-usable program code may be transmitted using any appropriate medium, including but not limited to wireless, wireline, optical fiber cable, RF, etc.

Computer program code for carrying out operations of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

As used herein, the term "component" refers to a component in a computing environment, such as service, application, middleware, hardware, device driver, operating system, or the like. The term "system configuration information" refers broadly to information related to dependencies among multiple components that configure the system, as well as to information capable of deriving relations useful for failure analysis. System configuration information may include, for example, the relation of connection and communication, and the relation between subject and object of operations in accordance with commands or instructions. The term "topology" refers to a conceptual map showing connections and dependencies among components.

In some embodiments of the present invention, system configuration information may include related information describing relationships among components, so that the detection rules can be generated to include not only the dependencies among components but also the related information. Further, candidate events may be presented based on the detection rules, thereby effectively supporting detection rule-generation work by a user, as well as reliably generating the detection rules of a certain level or higher without requiring the user to demonstrate a high level of skill in detection rule generation.

FIG. 1 is a block diagram showing an exemplary detection rule-generating apparatus in accordance with an embodiment of the present invention. The detection rule-generating apparatus 1 may include a Central Processing Unit ("CPU") 11, a memory 12, a storage device 13, an I/O interface 14, a communication interface 15, a video interface 16, a portable disk drive 17, and an internal bus 18 for connecting the above-mentioned hardware components.

The CPU 11 may be connected to each of the above-mentioned hardware components of the detection rule-generating apparatus 1 via the internal bus 18. The CPU 11 may control operation of the above-mentioned hardware components, as well as execute various software functions according to a computer program 100 stored in the storage device 13. The memory 12 may be configured as a volatile memory such as SRAM or SDRAM. In this manner, the memory 12 may store temporary data generated at the time of computer program 100 execution.

The storage device 13 may be configured as a built-in fixed storage device (hard disk), a ROM, or the like. The computer program 100 stored in the storage device 13 may be downloaded from a portable recording medium 90, such as a DVD or CD-ROM, through the portable disk drive 17. The portable recording medium 90 may store information, such as the program and data. This downloaded information may be loaded from the storage device 13 into the memory 12 at the time of execution. Of course, in other embodiments, the computer program may be downloaded from an external computer connected to a network 2 through a communication interface 15.

In some embodiments, the storage device 13 may include a symptom database 131. Upon detecting a failure or detecting an event that has caused a failure, a recommended action, a comment, or the like may be added to the symptom database 131. When a user selects one or more events that have caused a failure, a detection rule may be extracted according to the selected events. The detection rule may then be displayed on a display device 23, together with a topology diagram of components.

The storage device 13 may also include a configuration information storing section 132 for storing system configuration information of a system as a monitoring target to determine whether a failure has occurred, and a history information storing section 133 for storing history information, such as log information of the system, as the monitoring target and event information output when a failure has occurred. The configuration information storing section 132 may include a Change and Configuration Management Database ("CCMDB") that includes dependency information and related information for components of a monitoring target system 200. The topology diagram of components may be based on the system configuration information stored in the configuration information storing section 132. Although the configuration information storing section 132 may be included in the storage device 13, it may be provided separately from the detection rule-generating apparatus 1, e.g., it may be provided by an external computer connected through the network 2.

The communication interface 15 may be connected to the internal bus 18 so that it can exchange data with the external computer via connection to an external network 2 such as the Internet, LAN, or WAN. The communication interface 15 may also be connected to the monitoring target system 200 through the network 2, making it possible to acquire the system configuration information, history information, and the like at the time of a failure.

The I/O interface 14 may be connected to data input media such as a keyboard 21 or a mouse 22. The video interface 16 may be connected to the display device 23, such as a CRT monitor or an LCD, to display certain images.

Figure 2:
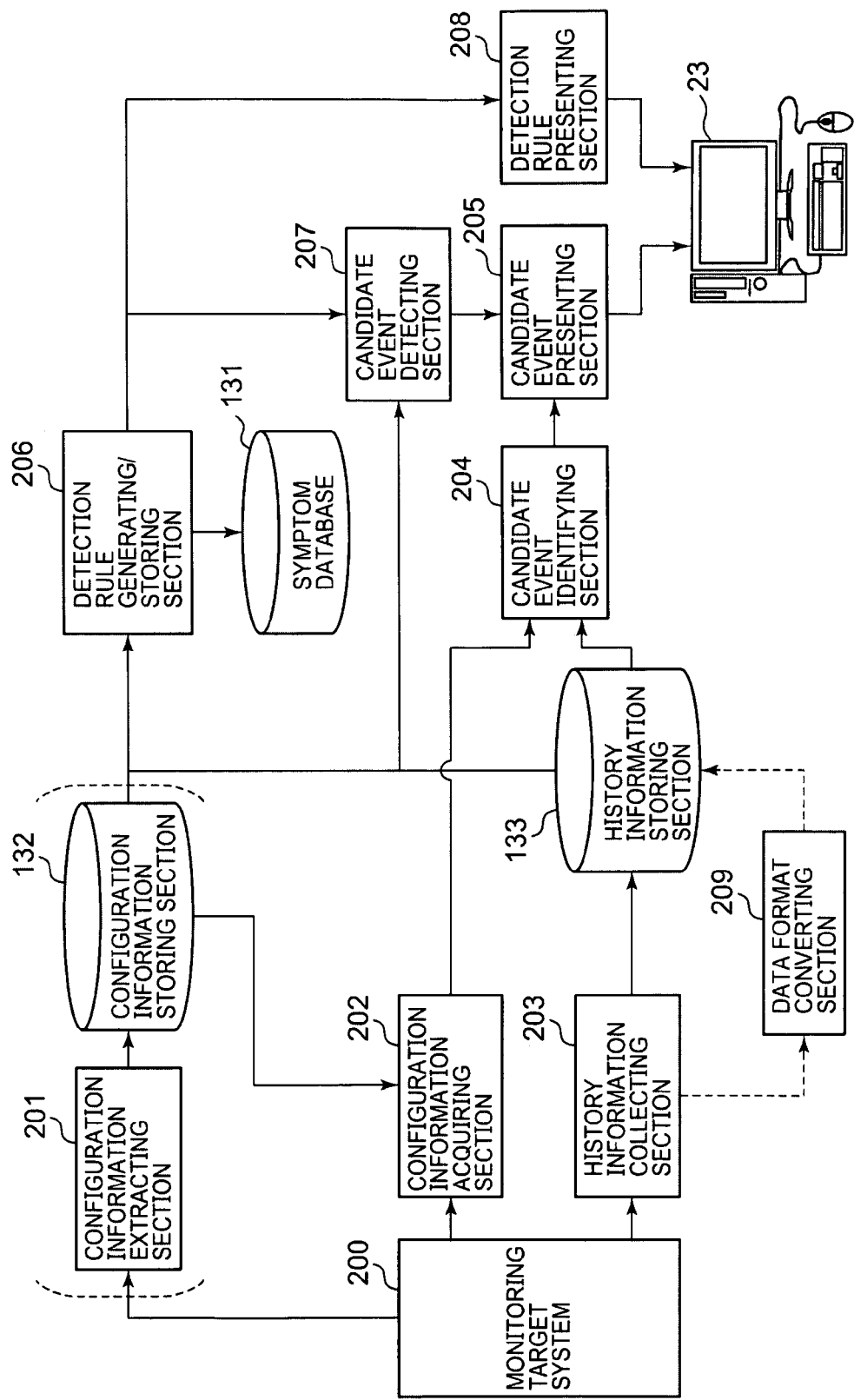
FIG. 2 is a functional block diagram illustrating a detection rule-generation in accordance with embodiments of the invention.

FIG. 2 illustrates detection rule generation by a detection rule-generating apparatus in accordance with embodiments of the present invention. A configuration information-extracting section 201 may extract the system configuration information, including related information for components included in the monitoring target system 200, and may store it in the configuration information-storing section 132. The system configuration information may include, for example, relations between components in communication with one another, link-related information related to an operating/operated relationship, and the like. Alternatively, in some embodiments, the system configuration information may be generated beforehand in the configuration information-storing section 132, and the configuration information-extracting section 201 may be omitted. In other words, the configuration information-extracting section 201 and the configuration information-storing section 132 may not be indispensable to the detection rule-generating apparatus 1 in accordance with embodiments of the present invention.

A configuration information-acquiring section 202 may acquire the system configuration information stored in the configuration information-storing section 132. The system configuration information may be stored in the configuration information-storing section 132 associated with each monitoring target system 200, and the configuration information-acquiring section 202 may acquire corresponding system configuration information according to the monitoring target system 200.

A history information-collecting section 203 may monitor the monitoring target system 200 at all times, collect history information such as output from each component included in the monitoring target system 200 and/or failure information such as event information output upon occurrence of a failure, and may store the history information in the history information-storing section 133. In certain embodiments, the log information may not be limited to system logs output at all times, and may include message information output by interrupt processing or the like at the time of failure occurrence.

Note that various portions of history information collected in the history information-collecting section 203 often have different formats. As a result, such portions may not be used as-is for identifying candidate events. It may therefore be desirable to include a data format-converting section 209 to convert the portions of history information into a standard unified data format, and store them in the history information-storing section 133.

In certain embodiments, however, log information and/or failure information may be collected in a unified data format, thereby facilitating display and analysis of events included in the log information and/or failure information, and allowing candidate events to be identified more easily, as discussed in more detail below.

A candidate event-identifying section 204 may identify candidate events based on the system configuration information acquired by the configuration information-acquiring section 202 and the history information stored in the history information-storing section 133. Such candidate events may facilitate generating a detection rule for detecting an event causing a failure.

A candidate event-presenting section 205 may present the identified candidate events on the display device 23. This may allow a user to select an optimal event from the listed candidate events, thereby facilitating accuracy in generating a detection rule.

A detection rule generating/storing section 206, on the other hand, may generate a detection rule based on system configuration information that includes the component from which the selected event has been sent. The detection rule may then be stored in the symptom database 131. A candidate event-detecting section 207 may present, on the display device 23 through the candidate event-presenting section 205, a next candidate event to be selected based on the generated detection rule and the stored history information. This may allow the user to select a more optimal event and generate the detection rule even more accurately. A detection rule-presenting section 208 may present, on the display device 23, a detection rule that may be updated by selecting a candidate event, as discussed in more detail below.

Figure 3:
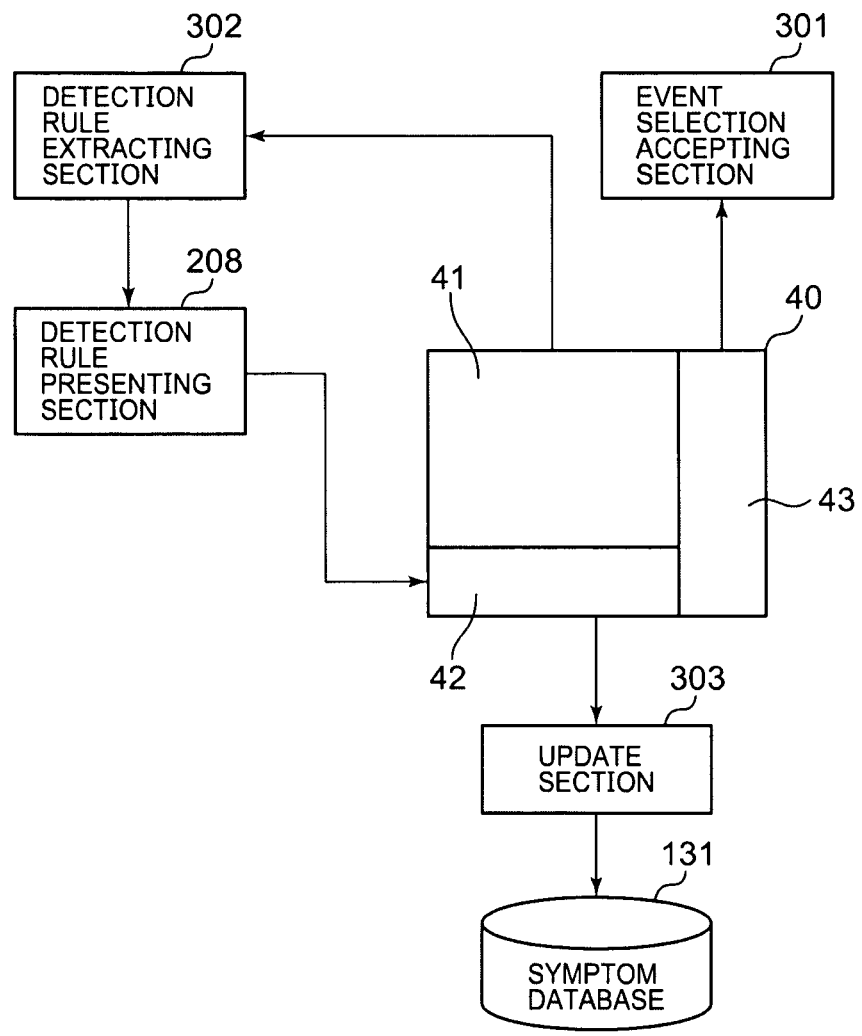
FIG. 3 is a functional block diagram illustrating detection rule updating in accordance with embodiments of the invention.

Referring now to FIG. 3, a detection rule may be updated by the detection rule-generating apparatus 1 in accordance with certain embodiments of the invention. An event selection-accepting section 301 may accept a user's selection of at least one event from an event list displayed on the display device 23. The event may be selected using a pointing device, such as the mouse 22, or by key input through the keyboard 21.

A detection rule-extracting section 302 may extract a detection rule according to a topology that includes one or more components corresponding to the accepted selected events. The extracted detection rule may be presented, by the detection rule-presenting section 208, on part of a screen 40 of the display device 23. The details of the display screen will be described below. An update section 303 may accept updates to the detection rule presented on the display device 23, and may update the symptom database 131.

Figure 4:
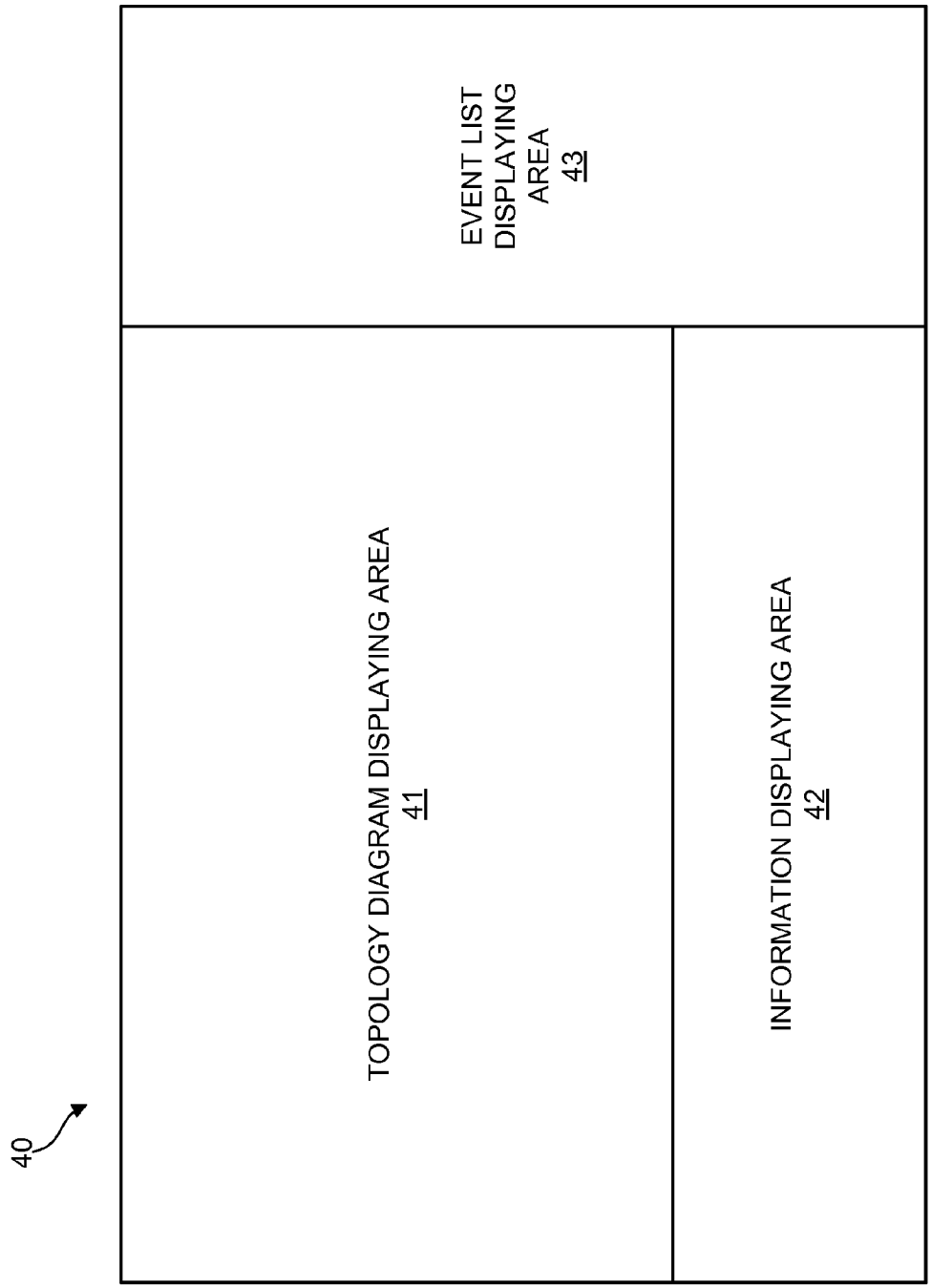
FIG. 4 is an illustration of a screen displayed on a display device in accordance with certain embodiments of the invention.

FIG. 4 illustrates one embodiment of a screen 40 displayed on display device 23. A topology diagram may be displayed in a topology diagram-displaying area 41, and may show dependencies among components included in the monitoring target system 200. In some embodiments, both recommended detection rules and recommended additional events may be displayed in a recommended information displaying area 42.

In an event list displaying area 43, events included in the monitoring target system 200 may be listed. When the event selection-accepting section 301 accepts the selection of candidate events from the events displayed in the event list-displaying area 43, the candidate events that have been selected and accepted, and events having dependencies, may be highlighted. As shown, the candidate events that have been accepted and an event having a dependency are indicated by a change in the display color, although such events may also be indicated by a change in brightness, or by any suitable method or means known to those in the art.

The detection rules extracted by the detection rule-extracting section 302 may be displayed in the recommended information-displaying area 42 in order of priority. Then, if any of the displayed detection rules is selected using the pointing device, such as the mouse 22, the topology diagram displayed in the topology diagram displaying area 41 may be changed.

The recommended additional events may also be displayed in the recommended information-displaying area 42. Therefore, when an additional event is selected through the update section 303 using the pointing device such as the mouse 22, the additional event may be added to the topology diagram displayed in the topology diagram displaying area 41 such that the symptom database 131 may be updated.

Figure 5:
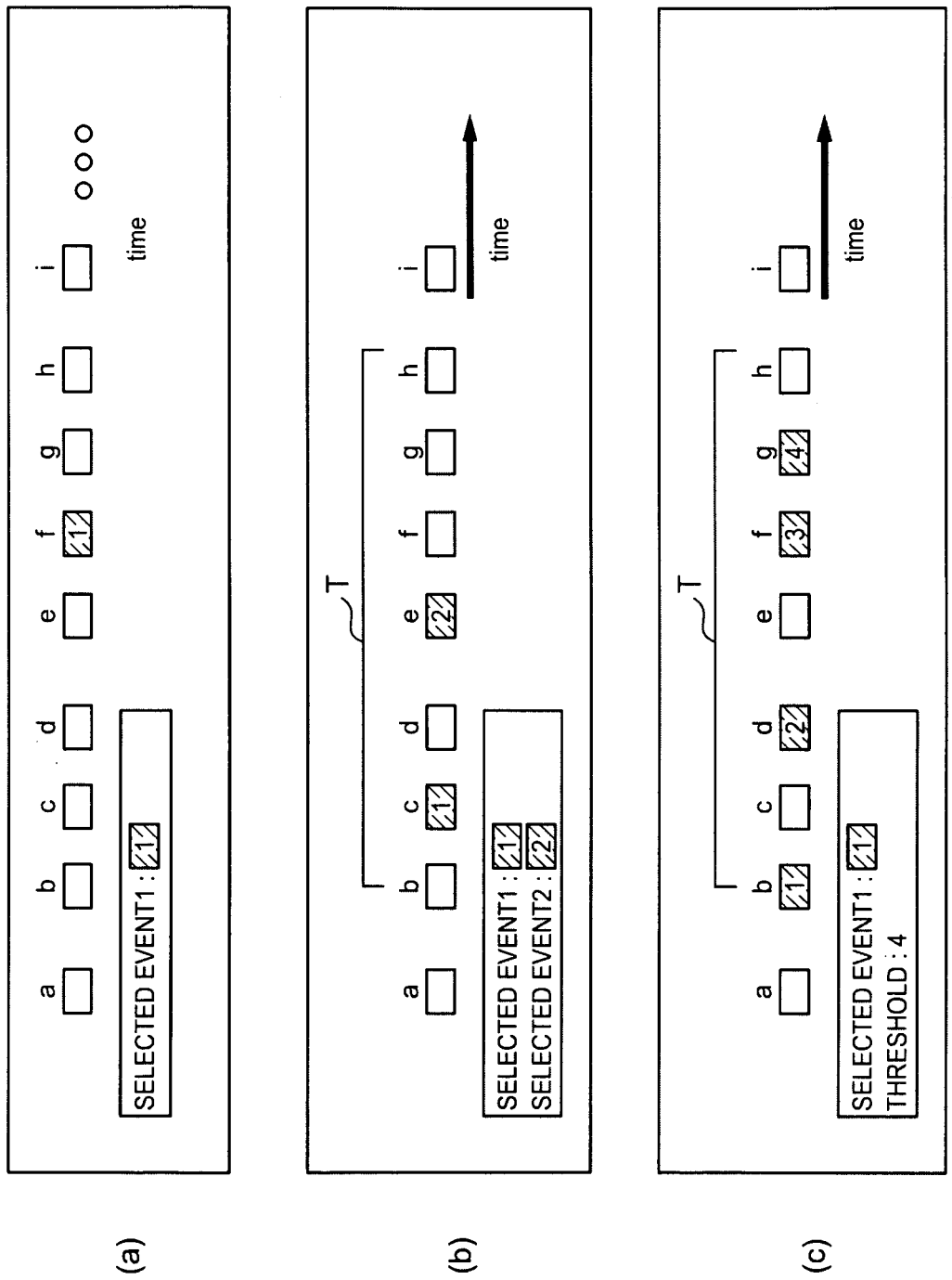
FIG. 5 illustrates typical rule patterns of detection rule generation in accordance with embodiments of the invention.

FIG. 5 illustrates typical rule patterns of the generated detection rules. For example, FIG. 5(a) illustrates a filter pattern, FIG. 5(b) illustrates a sequence pattern, and FIG. 5(c) illustrates a threshold pattern, respectively.

As shown in FIG. 5(a), a filter pattern may provide a detection rule for checking whether an individual event matches each of the selected events. This may provide an effective detection rule when there is one selected and accepted event. As shown, event f has been selected as selected event '1.'

As shown in FIG. 5(b), a sequence pattern may provide a detection rule for detecting the presence or absence of a sequence of events. This may provide an effective detection rule when there are multiple selected and accepted events. As shown, event 'c' corresponding to selected event '1,' and event 'e' corresponding to selected event '2' exist in this order among events existing within a certain fixed period T.

As shown in FIG. 5(c), a threshold pattern may provide a detection rule for comparing a certain numerical value with a threshold. This may provide an effective detection rule when there are multiple selected and accepted events. As shown, events 'b,' 'd,' 'f,' and 'g' corresponding to selected event '1,' from among events 'a' to event 'i,' are counted. The events hatched in FIG. 5(c) may be events corresponding to selected event '1' within the certain fixed period T. Here, since the threshold is set to 'four' events, it may be confirmed that events are selected in a range equal to or greater than the threshold.

Figure 6:
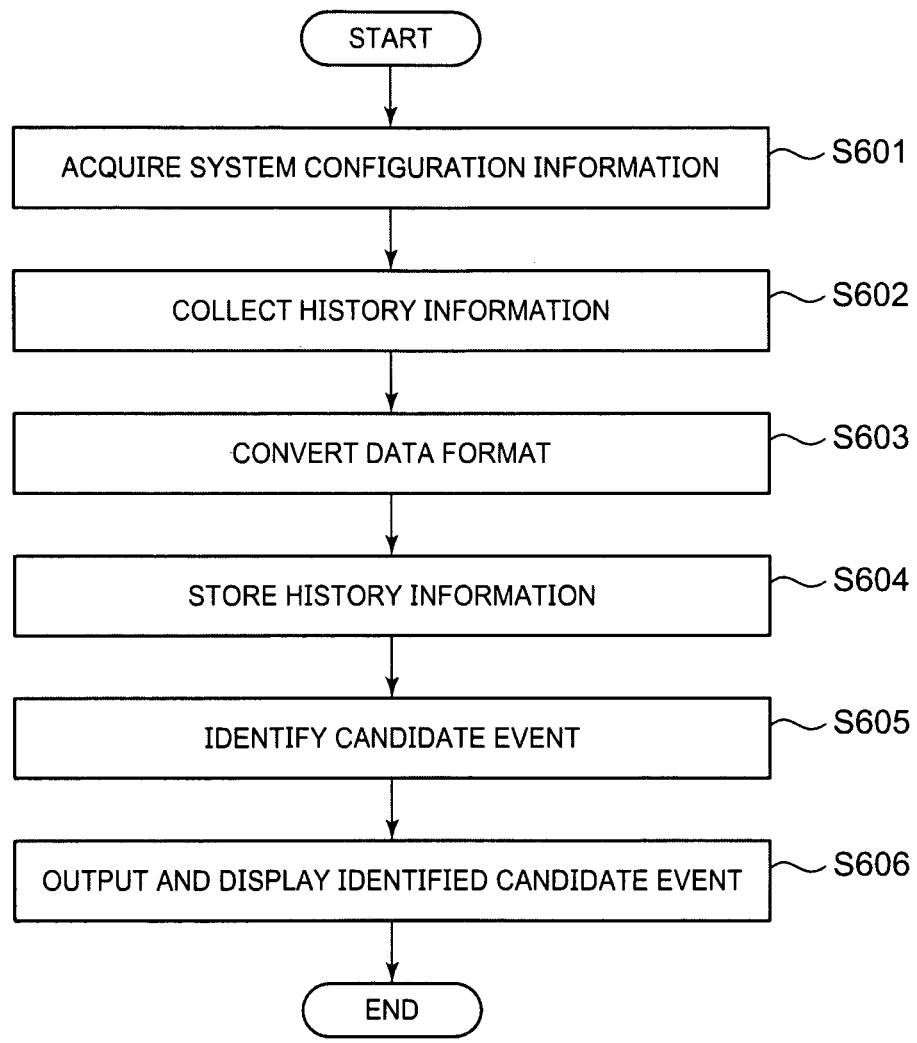
FIG. 6 is a flowchart showing a procedure for detection rule-generating processing by an apparatus in accordance with an embodiment of the invention.

FIG. 6 illustrates detection rule-generating processing by a detection rule-generating apparatus 1 in accordance with embodiments of the invention. First, the detection rule-generating apparatus 1 may acquire S601 system configuration information, including related information for components included in the monitoring target system 200. Of course, in some embodiments, the system configuration information may be acquired beforehand and pre-stored in the configuration information-storing section 132.

The CPU 11 of the detection rule-generating apparatus 1 may monitor the monitoring target system 200, collect S602 history information and/or failure information, convert S603 the data format to a standard unified data format, and store S604 the history information in the history information-storing section 133 of the storage device 13. The history information may include log information output from each component included in the monitoring target system 200. The failure information may include event information output upon occurrence of a failure. The log information is not limited to system logs output, and may include message information output by interrupt processing at the time of a failure occurrence.

The CPU 11 may identify S605 candidate events based on the system configuration information stored in the configuration information-storing section 132 and the history information stored in the history information-storing section 133. Either or both of the configuration information-storing section 132 and the history information-storing section 133 may be included in the storage device 13. Then, the CPU 11 may output and display S606 the identified candidate events on the display device 23.

This method of identifying the candidate events based on the system configuration information and the history information is not particularly limited. For simplicity, however, the procedure of identifying candidate events is described below with reference to the rule patterns of FIG. 5.

Among the rule patterns, the sequence pattern may be further classified into two kinds of rule patterns. An ordered sequence pattern may have an identified order, and an unordered sequence pattern may have an order that is not identified.

FIGS. 7(a) and 7(b) illustrate exemplary candidate events when a filter pattern is selected from the detection rules. Particularly, FIG. 7(a) illustrates a topology diagram displayed in the topology diagram displaying area 41. FIG. 7(b) illustrates events displayed in the event list displaying area 43.

Figure 7:
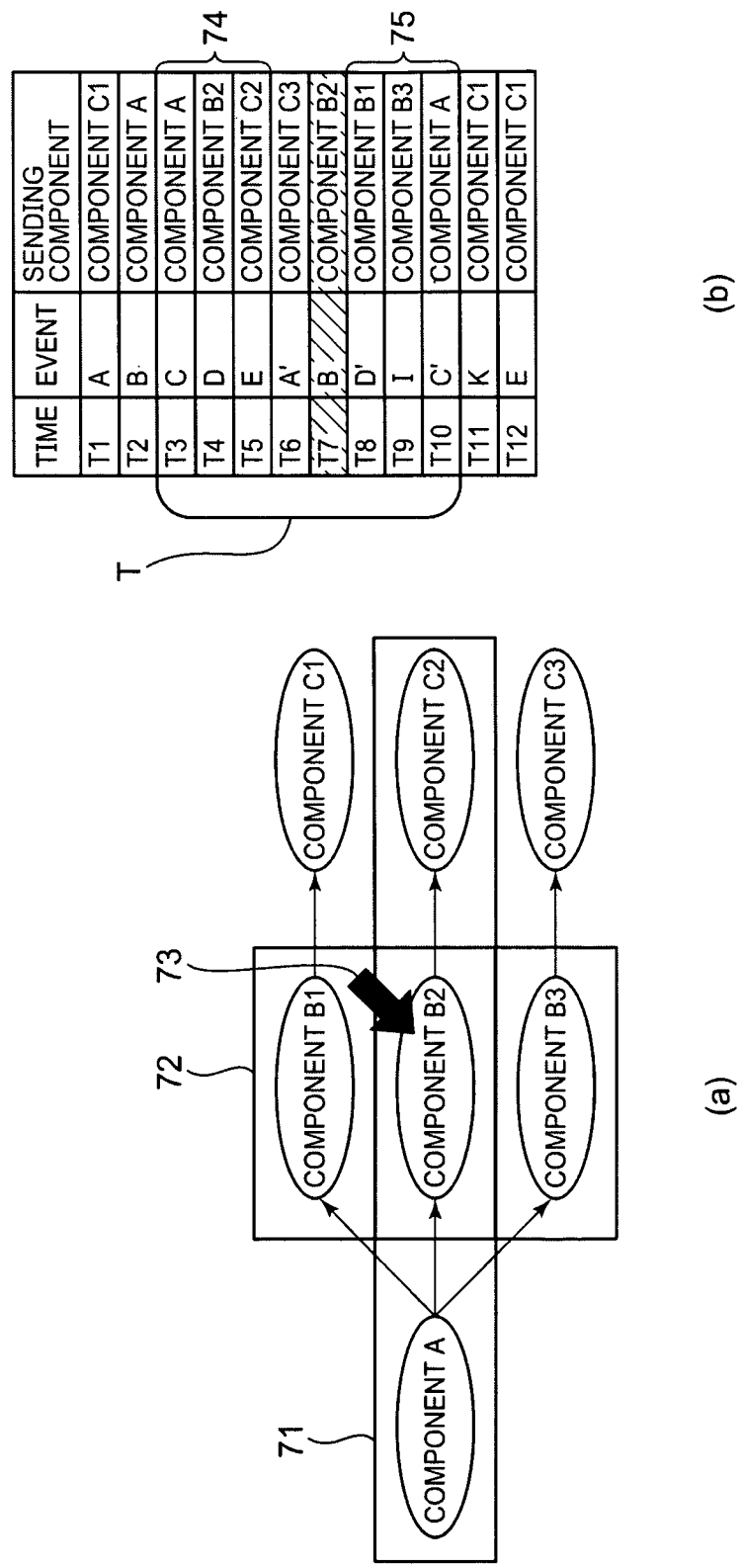
FIG. 7 is an illustration of candidate events when a filter pattern is selected from the detection rules in accordance with certain embodiments.

As shown in FIG. 7(a), if a selected event is component B2 (indicated by arrow 73), corresponding event B may also be selected and accepted in the event list-displaying area 43. As shown in FIG. 7(*b*), selected event B is indicated by highlighting or hatching.

From the topology diagram of FIG. 7(*a*), components A and C2 may be selected as close components 71 that are close to and have dependencies with the component B2. Therefore, events existing within the certain fixed period T and corresponding to the selected components A and C2 may become candidate events. Further, components B1, B2, and B3 may be selected as the same kind of components 72 that are in a parallel relationship with the component B2. Therefore, events existing within the certain fixed period T and corresponding to the selected components B1, B2, and B3 may also be candidate events. Thus, as shown in FIG. 7(*b*), events C, D, E, D', I, and C' may be identified as candidate events corresponding to sending component groups 74 and 75.

Figure 8:
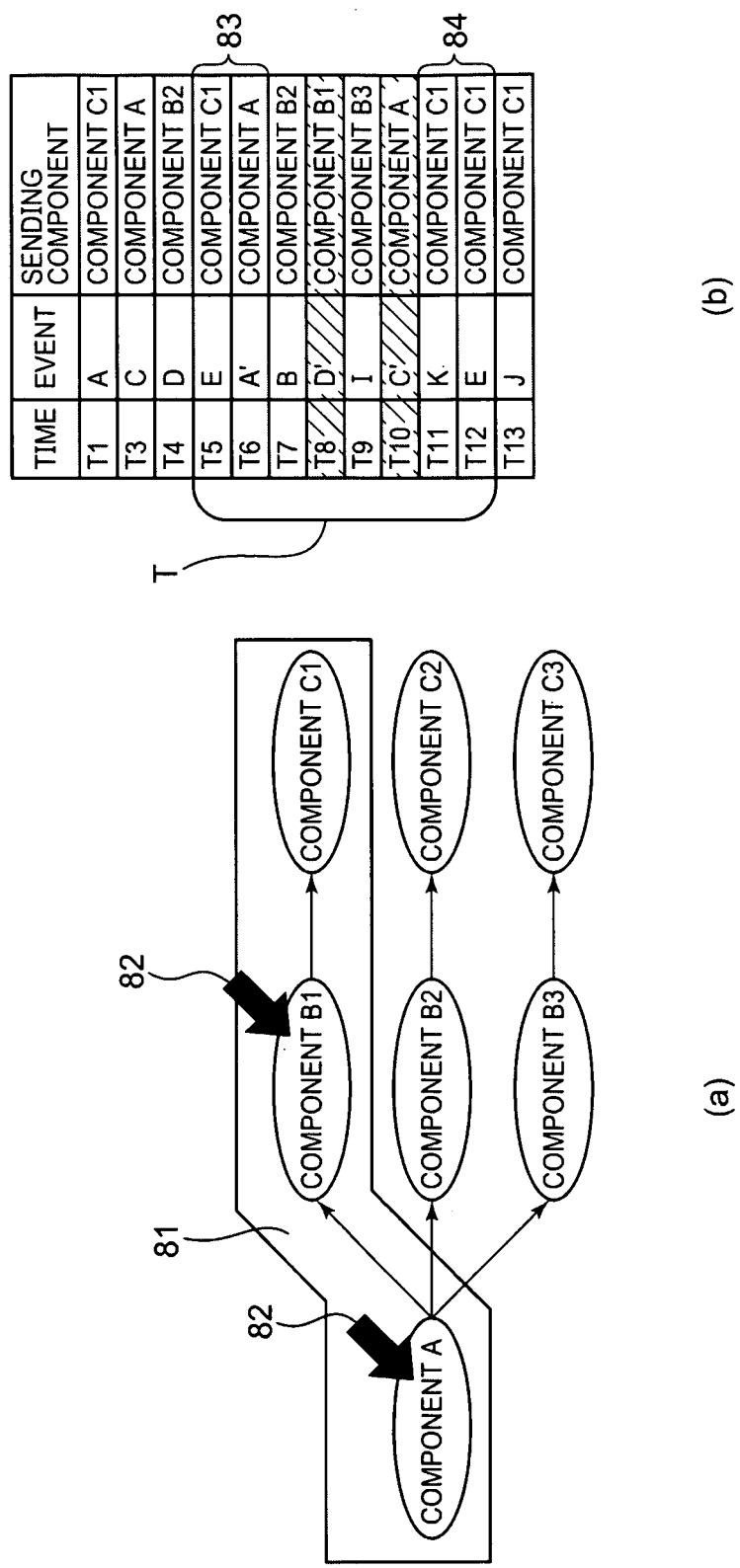
FIG. 8 is an illustration of candidate events when an ordered sequence pattern is selected from the detection rules in accordance with other embodiments.

FIG. 8 illustrates exemplary candidate events when the ordered sequence pattern is selected from the detection rules. Specifically, FIG. 8(*a*) illustrates a topology diagram displayed in the topology diagram-displaying area 41. FIG. 8(*b*) illustrates events displayed in the event list-displaying area 43.

As shown in FIG. 8(*a*), if selected and accepted events are components A and B1 (indicated by arrows 82), corresponding events C' (the selection of which has been accepted through the component A) and D' (the selection of which has been accepted through the component B1) may be highlighted in the event list-displaying area 43. As shown in FIG. 8(*b*), both selected and accepted events may be indicated by hatching.

Then, from the topology diagram of FIG. 8(*a*), components A, B1, and C1 may be selected as component group 81 having a serial relationship with the components A and B1. Therefore, events existing within the certain fixed period T and corresponding to the selected components A, B1, and C1 may be candidate events. Thus, events E, A', K, and E may be identified as candidate events corresponding to sending component groups 83 and 84, as shown in FIG. 8(*b*).

Figure 9:
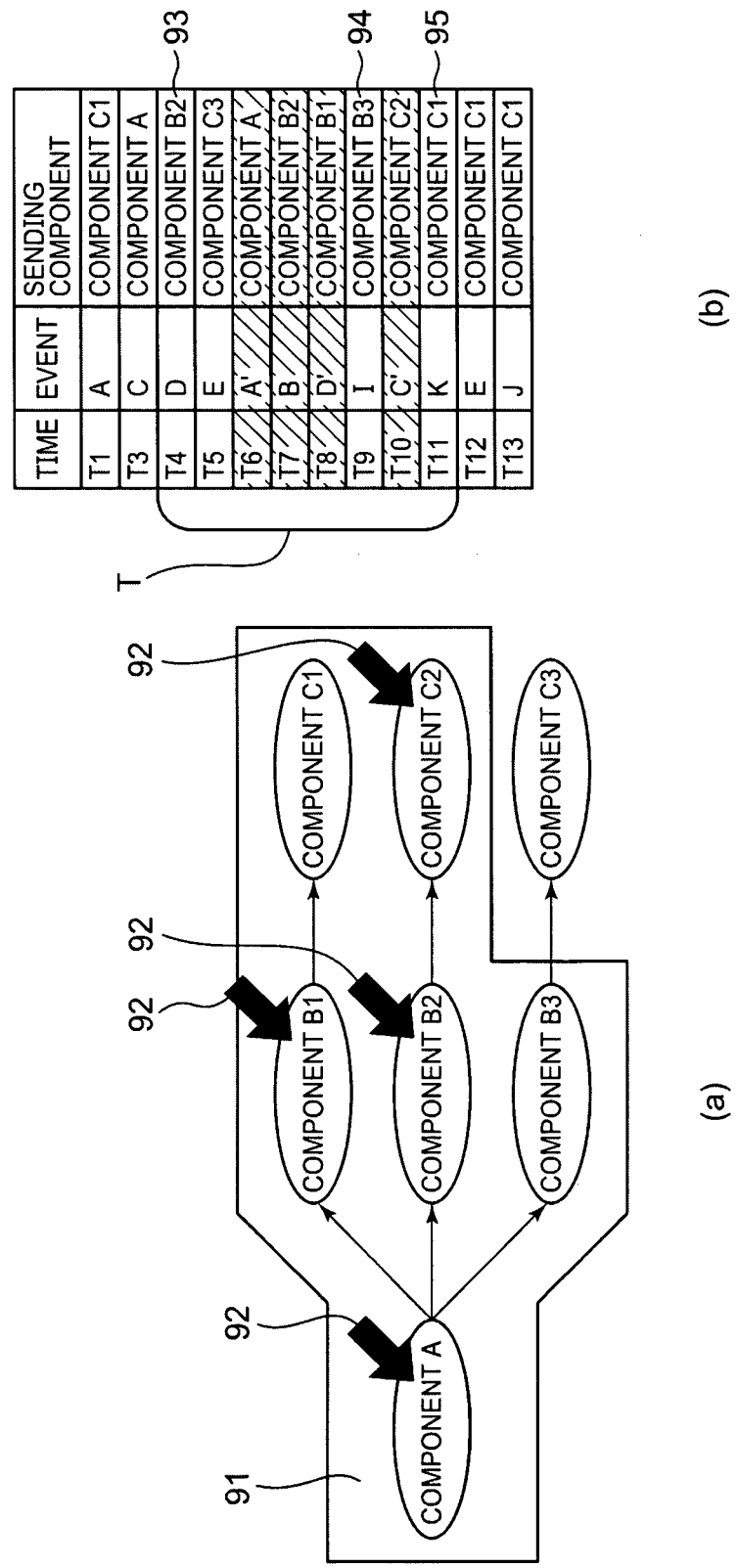
FIG. 9 is an illustration of candidate events when an unordered sequence pattern is selected from the detection rules in accordance with certain embodiments.

FIG. 9 illustrates exemplary candidate events when an unordered sequence pattern is selected from the detection rules. Specifically, FIG. 9(*a*) illustrates a topology diagram displayed in the topology diagram-displaying area 41. FIG. 9(*b*) illustrates events displayed in the event list-displaying area 43.

As shown in FIG. 9(*a*), if selected and accepted events are components A, B1, B2, and C2 (indicated by arrows 92), event A' (the selection of which has been accepted through the component A), event D' (the selection of which has been accepted through the component B1), event B (the selection of which has been accepted through the component B2), and event C' (the selection of which has been accepted through the component C2 may be highlighted in the event list-displaying area 43. As shown in FIG. 9(*b*), the event group may be indicated by hatching.

Then, from the topology diagram of FIG. 9(*a*), components A, B1, B2, B3, C1, and C2 may be selected as a component group 91 having a serial or partially serial relationship with components A, B1, B2, and C2. Therefore, events existing within the certain fixed period T and corresponding to the selected components A, B1, B2, B3, C1, and C2 may be candidate events. Thus, events D, I, and K may also be identified as candidate events corresponding to sending components 93, 94, and 95, as shown in FIG. 9(*b*).

Figure 10:
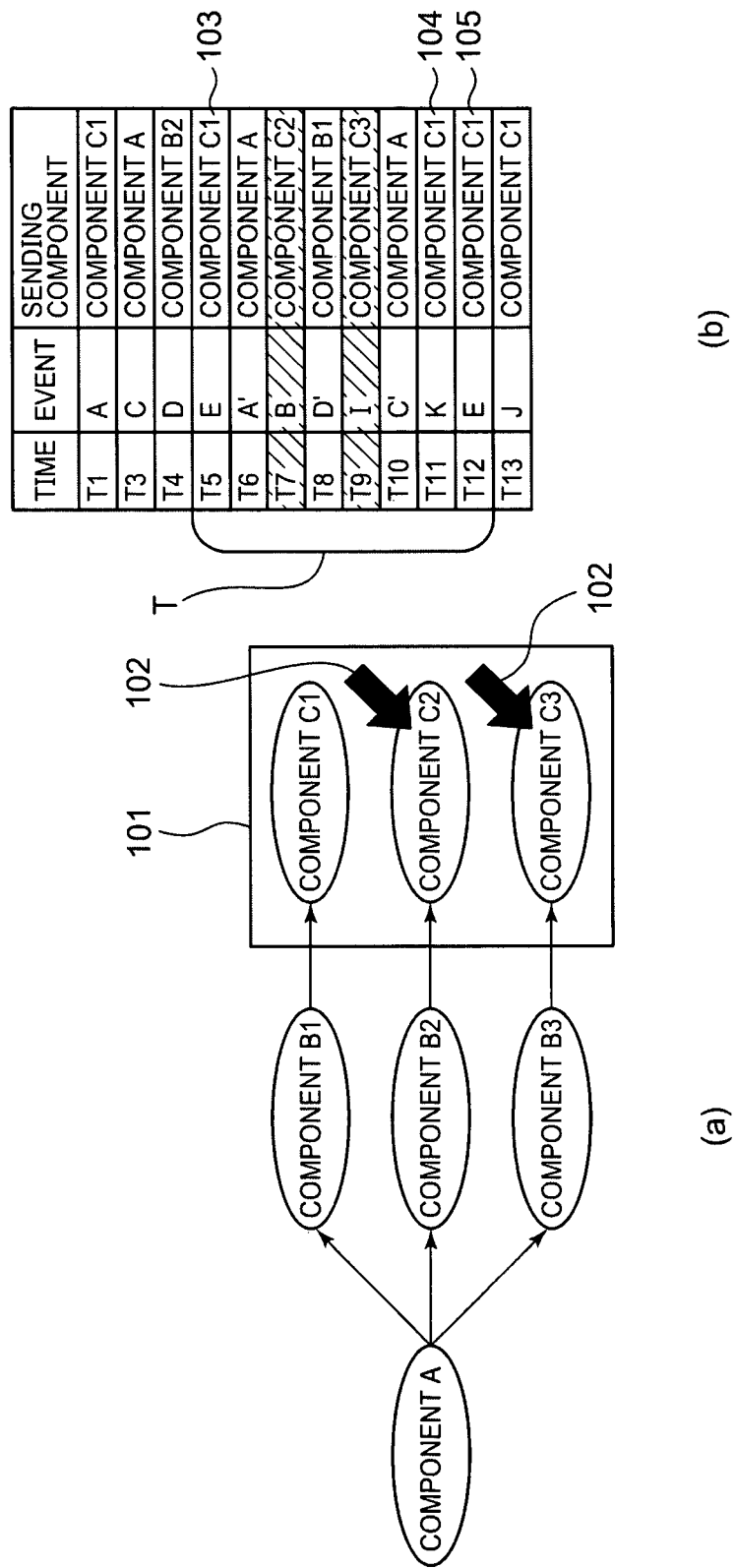
FIG. 10 is an illustration of candidate events when a threshold pattern is selected from the detection rules in certain embodiments.

FIG. 10 illustrates exemplary candidate events when a threshold pattern is selected from the detection rules. Specifically, FIG. 10(*a*) illustrates a topology diagram displayed in the topology diagram-displaying area 41. FIG. 10(*b*) illustrates events displayed in the event list-displaying area 43.

As shown in FIG. 10(*a*), if selected and accepted events are components C2 and C3 (indicated by arrows 102), event B (the selection of which has been accepted through the component C2), and event I (the selection of which has been accepted through the component C3), may be highlighted or otherwise indicated in the event list-displaying area 43. As shown in FIG. 10(*b*), the selected and accepted events are indicated by hatching.

Then, from the topology diagram of FIG. 10(*a*), components C1, C2, and C3 may be selected as component group 101 having a parallel relationship with components C2 and C3. Therefore, events existing within the certain fixed period T and corresponding to the selected components C1, C2, and C3 may be candidate events. Events E, K, and E may be identified as candidate events corresponding to sending components 103, 104, and 105 as shown in FIG. 10(*b*).

Figure 11:
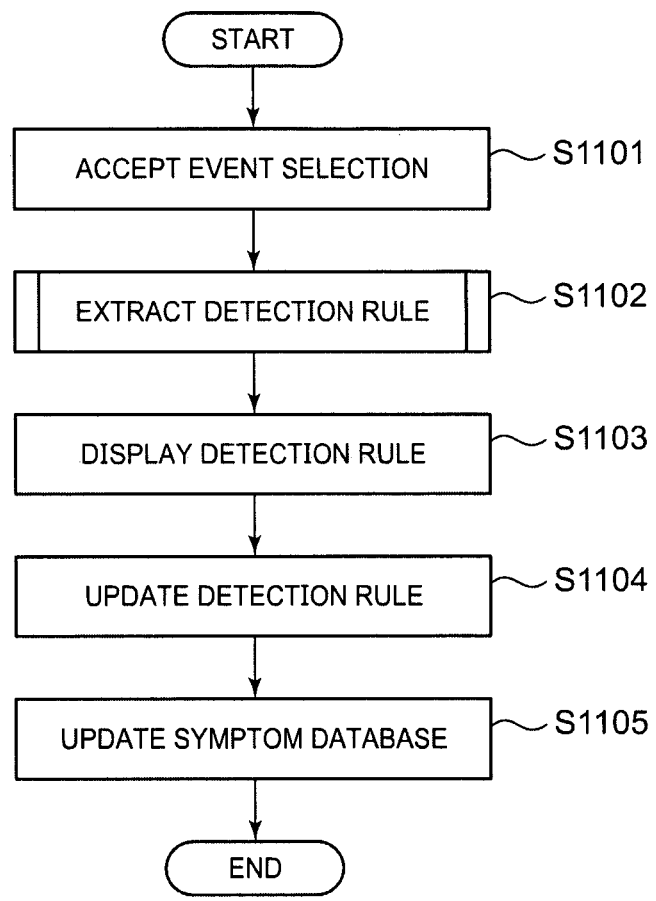
FIG. 11 is a flowchart showing detection rule update processing by an apparatus in accordance with embodiments of the invention.

FIG. 11 illustrates a procedure for detection rule update processing by a detection rule-generating apparatus 1 in accordance with embodiments of the present invention. The CPU 11 of the detection rule-generating apparatus 1 may accept S1101 a user's event selection. The user's event selection may be made using a pointing device such as the mouse 22, or by key input through the keyboard 21.

The CPU 11 may extract SI 102 a detection rule according to a topology including one or more components corresponding to the event or events that have been selected and accepted. The CPU 11 may display S1103 the extracted detection rule on the display device 23. The updated detection rule may then be accepted S1104, and the symptom database 131 may be updated S1105. As detection rules may be easily updated according to the acceptance of selected events in this manner, detection rules may be generated that are more adapted to actual system configuration.

Figure 12:
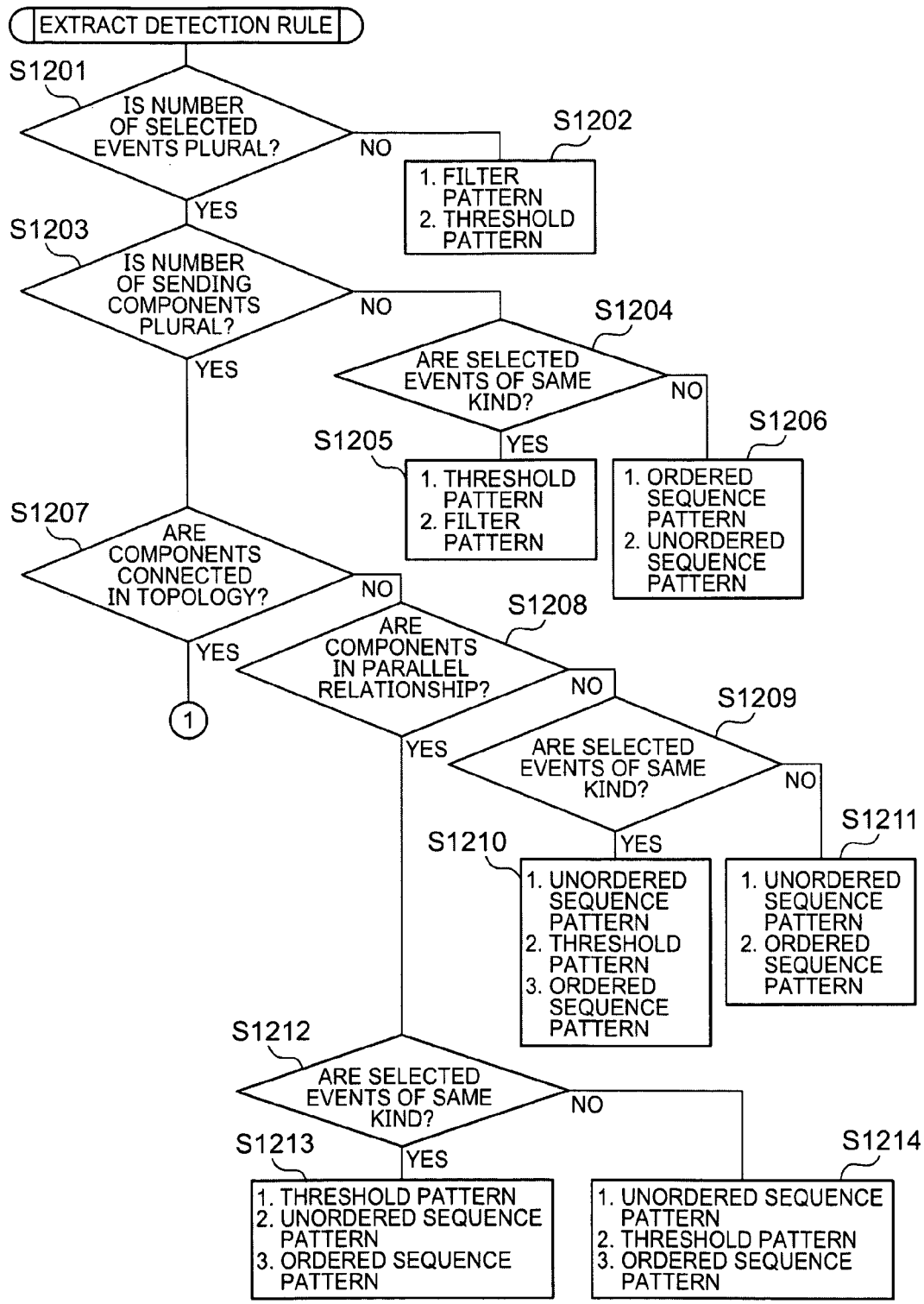
FIG. 12 is a flowchart showing detection rule extracting processing by an apparatus in accordance with embodiments of the invention.
Figure 13:
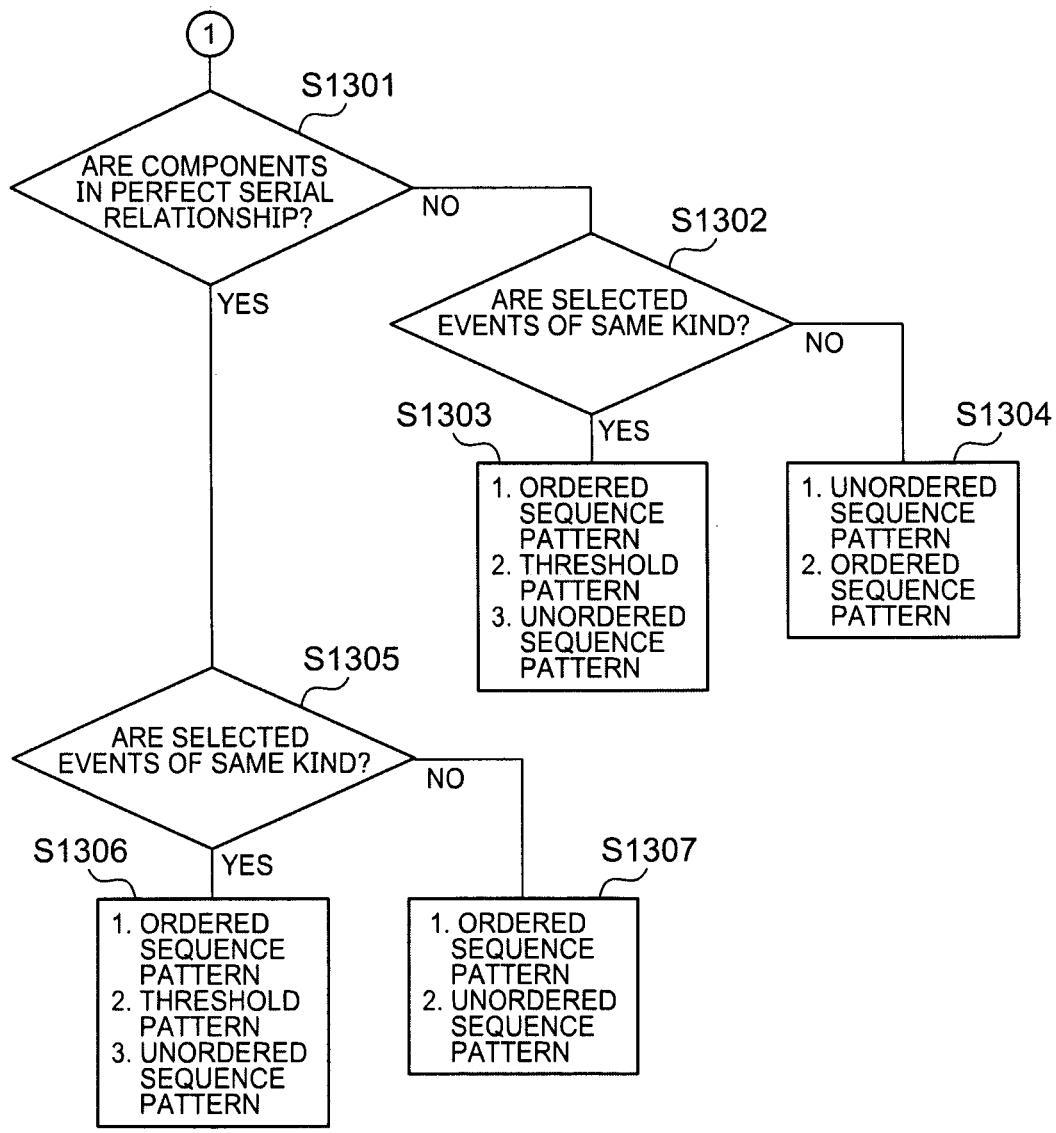
FIG. 13 a flowchart showing detection rule extracting processing by an apparatus in accordance with embodiments of the invention.

Although the method of extracting a detection rule is not particularly limited, a rule pattern may be recommended in some embodiments according to the selected event and the topology. FIGS. 12 and 13 illustrate a procedure of detection rule-extraction processing by a detection rule-generating apparatus 1 in accordance with embodiments of the present invention.

As shown in FIG. 12, in some embodiments, the CPU 11 of the detection rule-generating apparatus 1, utilizing a quantity determination section, for example, may determine S1201 whether there are multiple selected and accepted events. If not, the CPU 11 may give priority to extraction of the filter pattern S1202. It is, of course, understood that the threshold pattern may be extracted in some embodiments.

Figure 14:
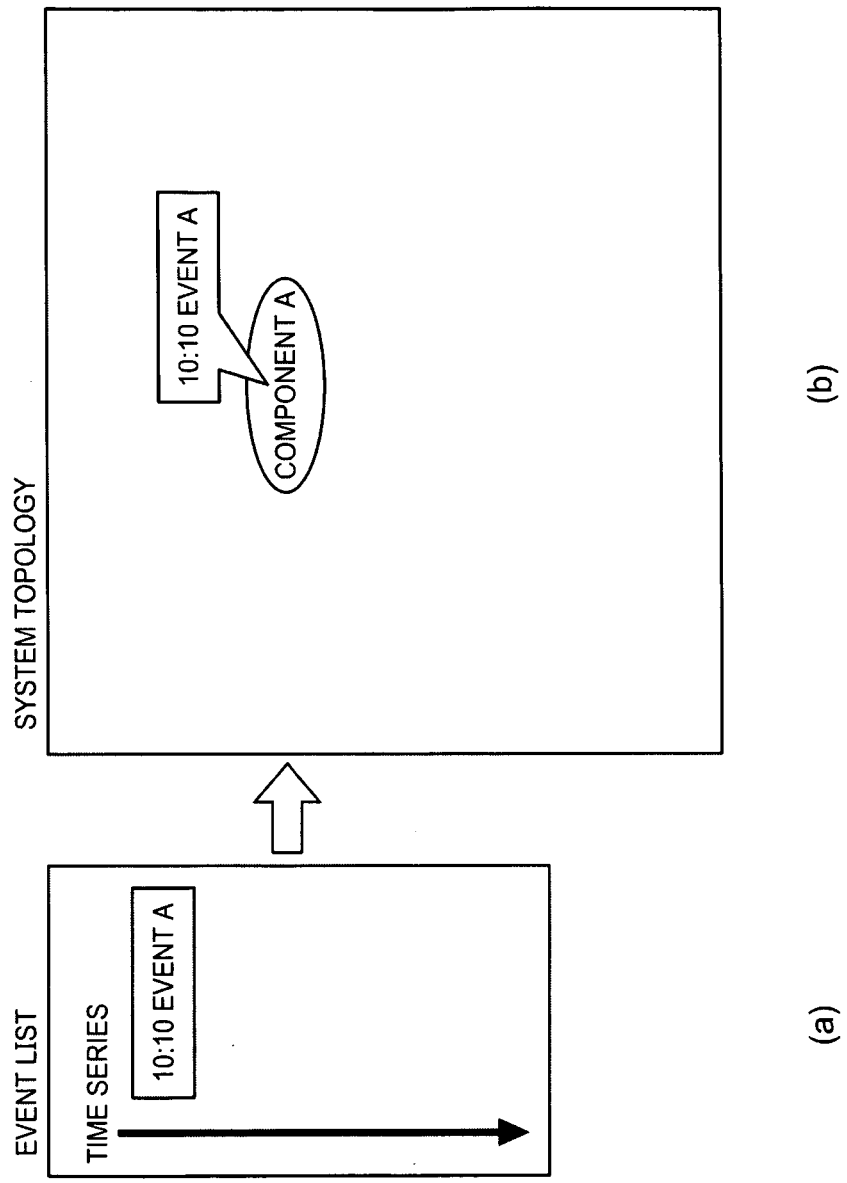
FIG. 14 illustrates a topology when the number of selected events is singular.

For example, FIGS. 14(*a*) and 14(*b*) illustrate a topology when the number of selected events is singular. Specifically, FIG. 14(*a*) illustrates an event including the event occurrence time. FIG. 14(*b*) illustrates a topology diagram including the event occurrence time.

As shown in FIG. 14, since event A sent out from component A occurred singularly at 10:10, extraction of detection rules, other than checking the presence of the event and counting the number of events, is substantially unnecessary. Therefore, extraction of the filter pattern as the detection rule may be given priority, although the threshold pattern may be extracted in some embodiments.

Returning now to FIG. 12, if the number of selected events is more than one, the CPU 11 of the detection rule-generating apparatus 1, utilizing a component determination section, for example, may determine S1203 whether the number of components from which multiple selected events have been sent out is more than one. If not, the CPU 11 may utilize an event determination section, for example, to determine S1204 whether the selected events are the same kind or type. If yes, the CPU 11 may give priority to extraction of the threshold pattern as the detection rule S1205. It is, of course, understood that the filter pattern may be extracted in some embodiments.

For example, FIGS. 15(a) and 15(b) illustrate a topology when the number of selected events is plural and the selected events are the same kind. Specifically, FIG. 15(a) illustrates events including the event occurrence times. FIG. 15(b) illustrates a topology diagram including the event occurrence times.

Figure 15:
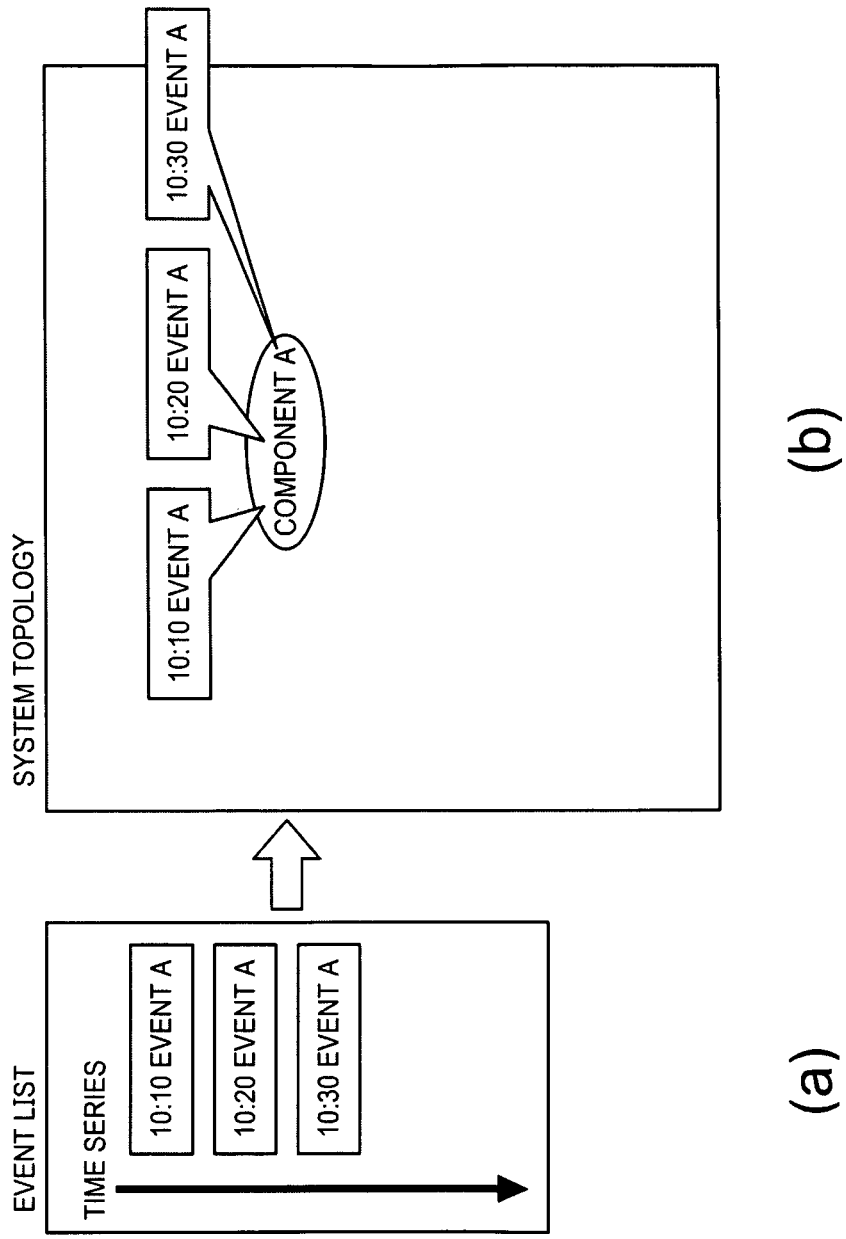
FIG. 15 illustrates a topology when the number of selected events is plural and the selected events are the same type.

In FIG. 15, since event A sent out from component A occurred three times at 10:10, 10:20, and 10:30, respectively, extraction of detection rules other than counting the number of events and checking the presence of the events is substantially unnecessary. Therefore, extraction of the threshold pattern as the detection rule may be given priority.

Returning again to FIG. 12, if it is determined S1204 that there are multiple selected events, the CPU 11 of the detection rule-generating apparatus 1 may extract S1206 a sequence pattern as the detection rule. In this case, either the ordered sequence pattern or the unordered sequence pattern may be extracted on a priority basis according to the presence or absence of ordering of selected events. However, since the selected events are different from each other, extraction of the ordered sequence pattern may be given priority.

FIGS. 16(a) and 16(b) illustrate a topology when there are multiple selected events and the selected events are different kinds or types. Specifically, FIG. 16(a) illustrates events including the event occurrence times. FIG. 16(b) illustrates a topology diagram including the event occurrence times.

Figure 16:
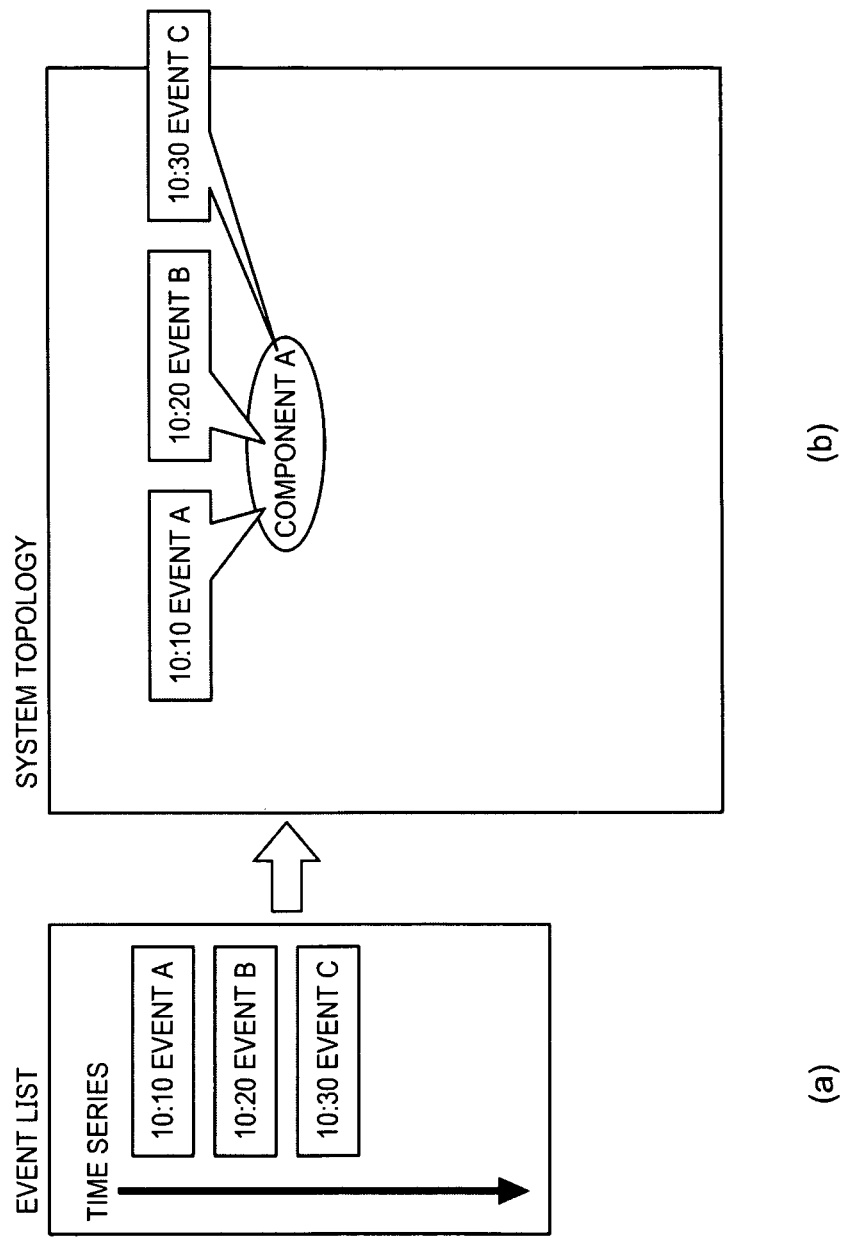
FIG. 16 illustrates a topology when the number of selected events is plural and the selected events are different types.

As shown in FIG. 16, since three kinds of events A, B, and C occurred at 10:10, 10:20, 10:30, respectively, the detection rule that considers the order of occurrence of events may be extracted. Therefore, a sequence pattern may be extracted as the detection rule.

Returning again to FIG. 12, if it is determined S1203 that the number of sending components is plural, the CPU 11 of the detection rule-generating apparatus 1 may utilize a connection determination section, for example, to determine S1207 whether the components are connected in a topology. If not, the CPU 11 may utilize a parallel relationship-determining section, for example, to determine S1208 whether the relation between components is parallel.

If the relation between components is not parallel, the CPU 11 may then utilize an event determination section, for example, to determine whether the selected events are the same kind or type. If yes, the CPU 11 may extract S1210 the unordered sequence pattern as the detection rule. It is, of course, understood that the threshold pattern may be extracted or the ordered sequence pattern may be extracted in certain embodiments.

For example, FIGS. 17(a) and 17(b) illustrate a topology when the number of selected events is plural, the relationship among components is uncorrelated, and the selected events are of the same kind or type. Specifically, FIG. 17(a) illustrates events including the event occurrence times. FIG. 17(b) illustrates a topology diagram including the event occurrence times.

Figure 17:
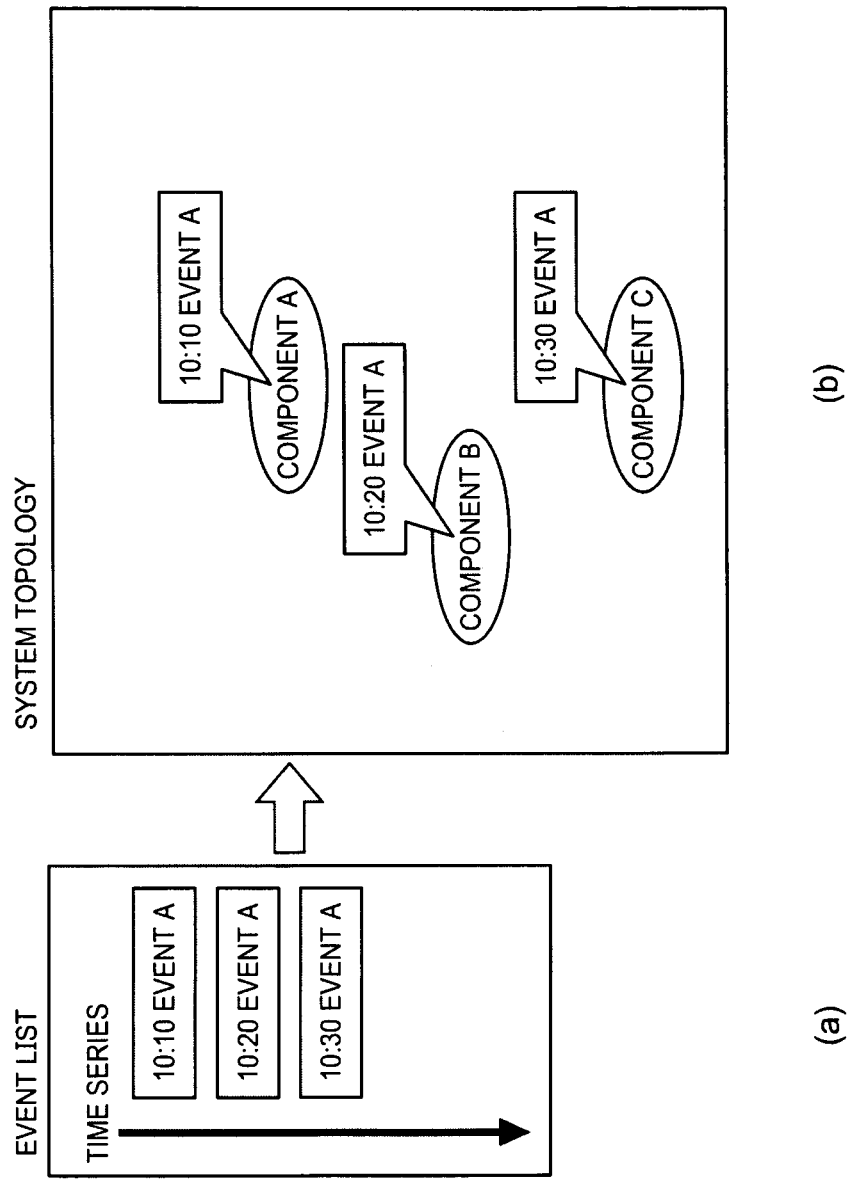
FIG. 17 illustrates a topology when the number of selected events is plural, the relationship among components is uncorrelated, and the selected events are the same type.

As shown in FIG. 17, since the same event A from three components A, B, and C occurred at 10:10, 10:20, and 10:30, respectively, a sequence of events that are in random order may be detected. Therefore, an unordered sequence pattern may be extracted as the detection rule.

Returning now to FIG. 12, if it is determined that the selected events are different kinds or types, the CPU 11 of the detection rule-generating apparatus 1 may extract S1211 a sequence pattern as the detection rule. In this case, either the ordered sequence pattern or the unordered sequence pattern may be extracted on a priority basis, according to the presence or absence of ordering of selected events. However, since the components are in neither the serial nor parallel relationship, the unordered sequence pattern may be extracted.

For example, FIGS. 18(a) and 18(b) illustrate a topology when there are multiple selected events, the relationship among components is uncorrelated, and the selected events are different. Specifically, FIG. 18(a) illustrates events including the event occurrence times. FIG. 18(b) illustrates a topology diagram including the event occurrence times.

Figure 18:
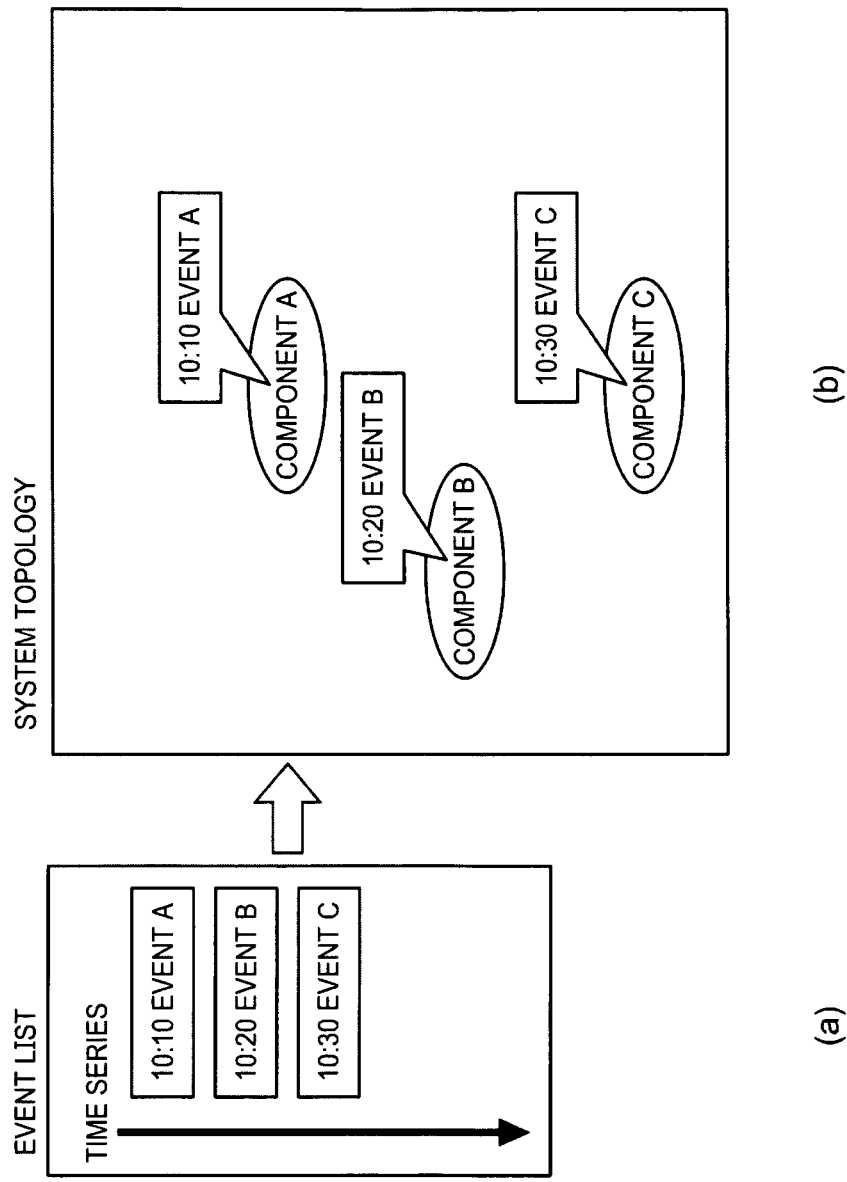
FIG. 18 illustrates a topology when the number of selected events is plural, the relationship among components is uncorrelated, and the selected events are different types.

As shown in FIG. 18, since different events A, B, and C from three components A, B, and C occurred at 10:10, 10:20, 10:30, respectively, a sequence of events that are in random order may be detected. Therefore, an unordered sequence pattern may be extracted as the detection rule.

Returning again to FIG. 12, if it is determined that the relation among components is parallel, the CPU 11 of the detection rule-generating apparatus 1 may determine S1212 whether the selected events are the same kind or type. If yes, the CPU 11 may extract S1213 the threshold pattern as the detection rule. It is, of course, understood that an unordered sequence pattern or an ordered sequence pattern may be extracted in certain embodiments.

For example, FIGS. 19(a) and 19(b) illustrate a topology when the number of selected events is plural, the relationship among components is the parallel relationship, and the selected events are the same kind. Specifically, FIG. 19(a) illustrates events including the event occurrence times. FIG. 19(b) illustrates a topology diagram including the event occurrence times.

Figure 19:
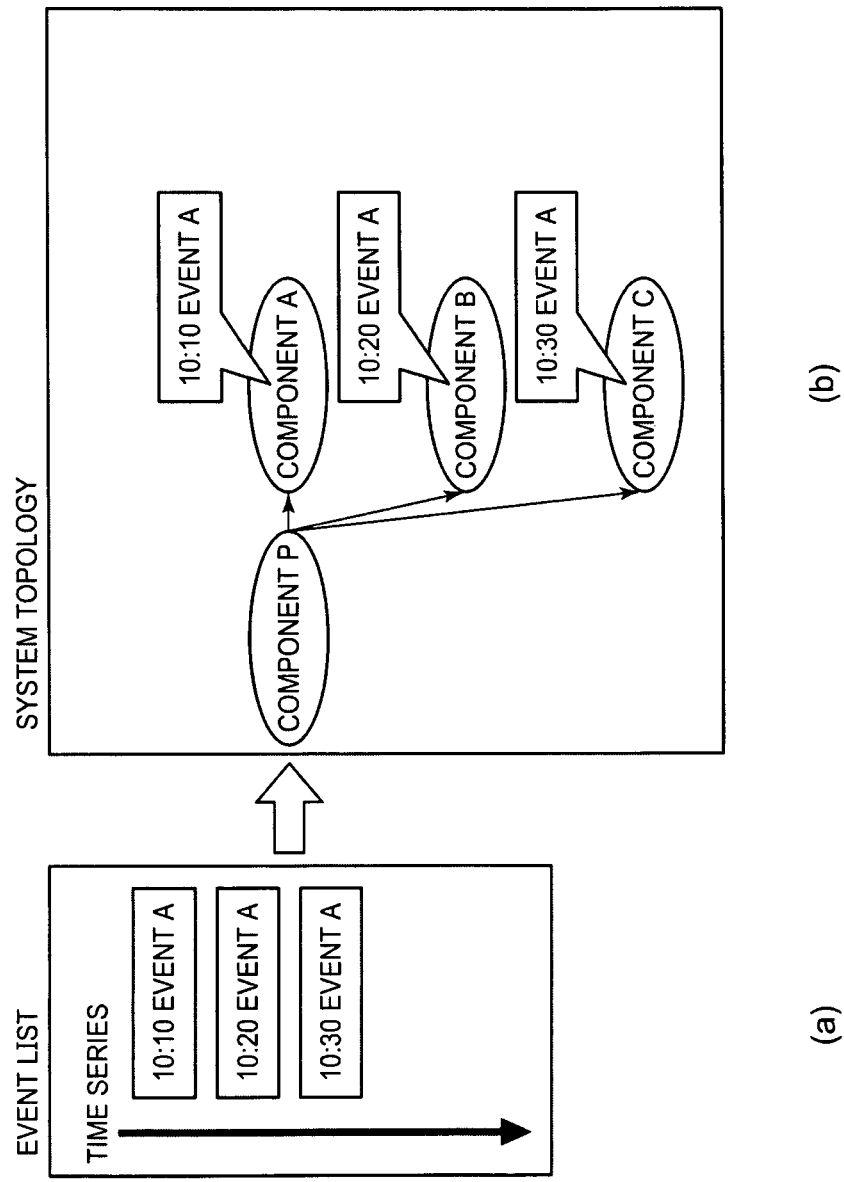
FIG. 19 illustrates a topology when the number of selected events is plural, the relationship among components is parallel, and the selected events are of the same kind.

As shown in FIG. 19, since event A from three components A, B, and C connected to and in a parallel relationship with component P occurred at 10:10, 10:20, and 10:30, respectively, a sequence of events in random order may be detected. Therefore, an unordered sequence pattern may be extracted as the detection rule.

Returning again to FIG. 12, if it is determined that the selected events are different kinds, the CPU 11 of the detection rule-generating apparatus 1 may extract S1214 an unordered sequence pattern as the detection rule. It is, of course, understood that the threshold pattern or the ordered sequence pattern may be extracted in certain embodiments.

For example, FIGS. 20(a) and 20(b) illustrate a topology when the number of selected events is plural, the relationship among components is parallel, and the selected events are different kinds or types. Specifically, FIG. 20(a) illustrates events including the event occurrence times. FIG. 20(b) illustrates a topology diagram including the event occurrence times.

Figure 20:
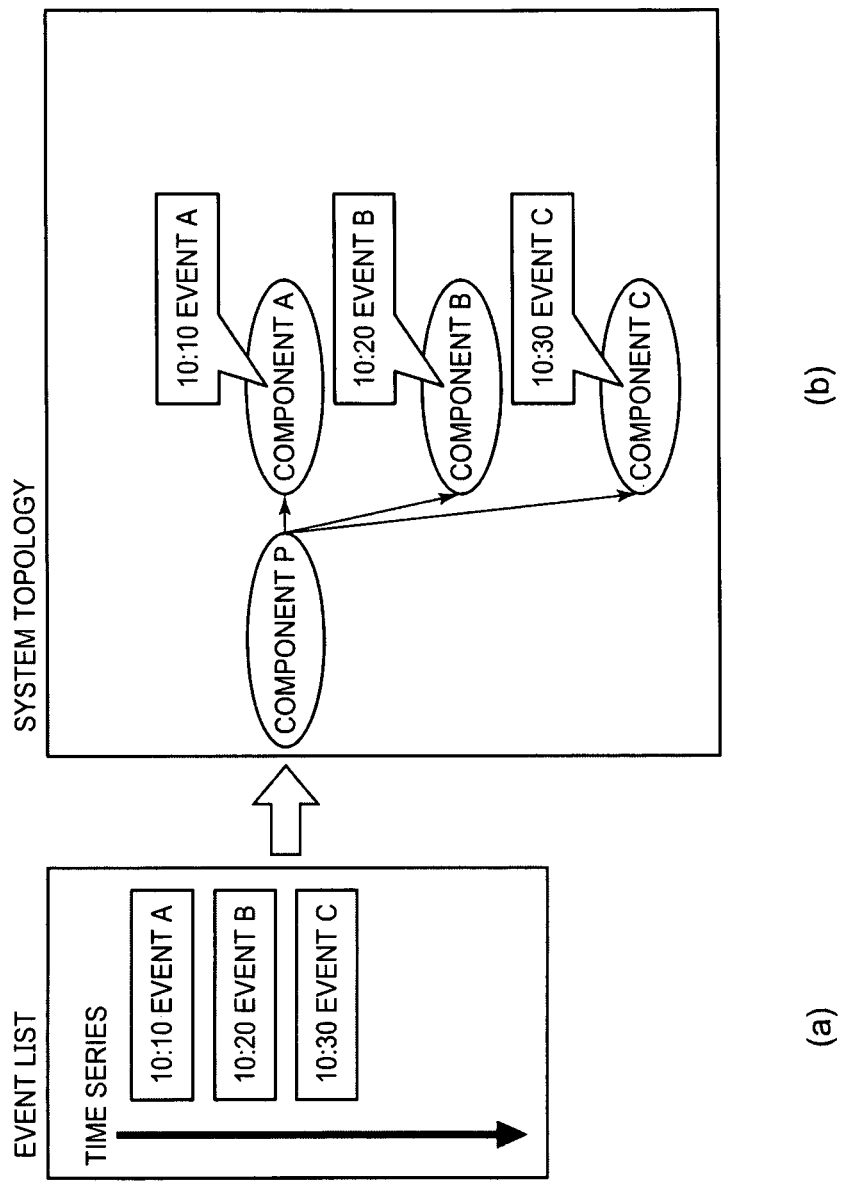
FIG. 20 illustrates a topology when the number of selected events is plural, the relationship among components is parallel, and the selected events are different types.

As shown in FIG. 20, since different events A, B, and C from three components A, B, and C connected to and in a parallel relationship with component P occurred at 10:10, 10:20, and 10:30, respectively, the number of events may be counted instead of detecting a sequence of events. Therefore, a threshold pattern may be extracted as the detection rule.

Returning again to FIG. 12, if it is determined that the components are connected in the topology, the CPU 11 of the detection rule-generating apparatus 1 may then utilize a serial relationship-determining section, for example, to determine S1301 whether the components are in a perfect serial relationship as shown in FIG. 13. If it is determined that the components are not in the perfect serial relationship, the CPU 11 may then determine whether the selected events are the same kind or type.

If it is determined that the selected events are of the same kind, the CPU 11 may extract S1303 the ordered sequence pattern as the detection rule. It is, of course, understood that the threshold pattern or the unordered sequence pattern may be extracted in certain embodiments.

Figure 21:
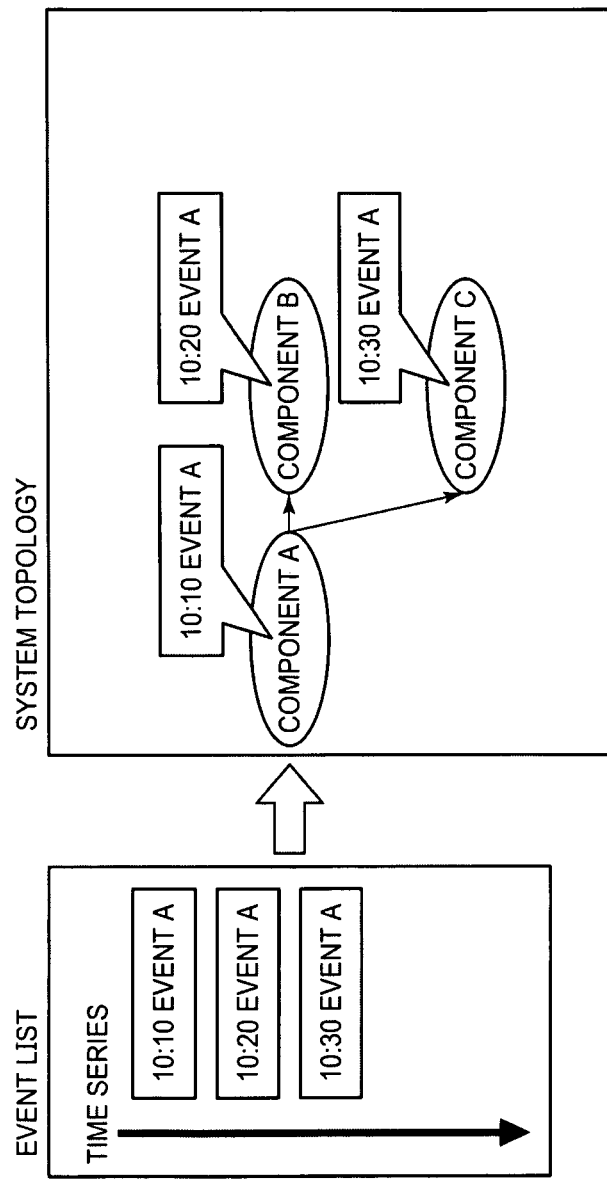
FIG. 21 illustrates a topology when the number of selected events is plural, the relationship among components is not a perfect serial relationship, and the selected events are the same type.

FIGS. 21(a) and 21(b) illustrates a topology when the number of selected events is plural, the relationship among components is not a perfect serial relationship, and the selected events are of the same kind or type. Specifically, FIG. 21 (a) illustrates events including the event occurrence times. FIG. 21(b) illustrates a topology diagram including the event occurrence times.

As shown in FIG. 21, since event A (from component A) and components B and C (connected to component A and in a parallel relationship therewith) occurred at 10:10, 10:20, and 10:30, respectively, a sequence of event may be detected, rather than counting the number of events, even if they are in random order. Therefore, the unordered sequence pattern may be extracted as the detection rule.

Returning now to FIG. 13, if it is determined that there are multiple kinds of selected events, the CPU 11 of the detection rule-generating apparatus 1 may extract S1304 a sequence pattern as the detection rule. In this case, either the ordered sequence pattern or the unordered sequence pattern may be extracted on a priority basis according to the presence or absence of ordering of selected events. However, since the components are not in a perfect serial relationship, the unordered sequence pattern may be extracted.

FIGS. 22(a) and 22(b) illustrate a topology when the number of selected events is plural, the relationship among components is not a perfect serial relationship, and the selected events are different kinds. Specifically, FIG. 22(a) illustrates events including the event occurrence times. FIG. 22(b) illustrates a topology diagram including the event occurrence times.

Figure 22:
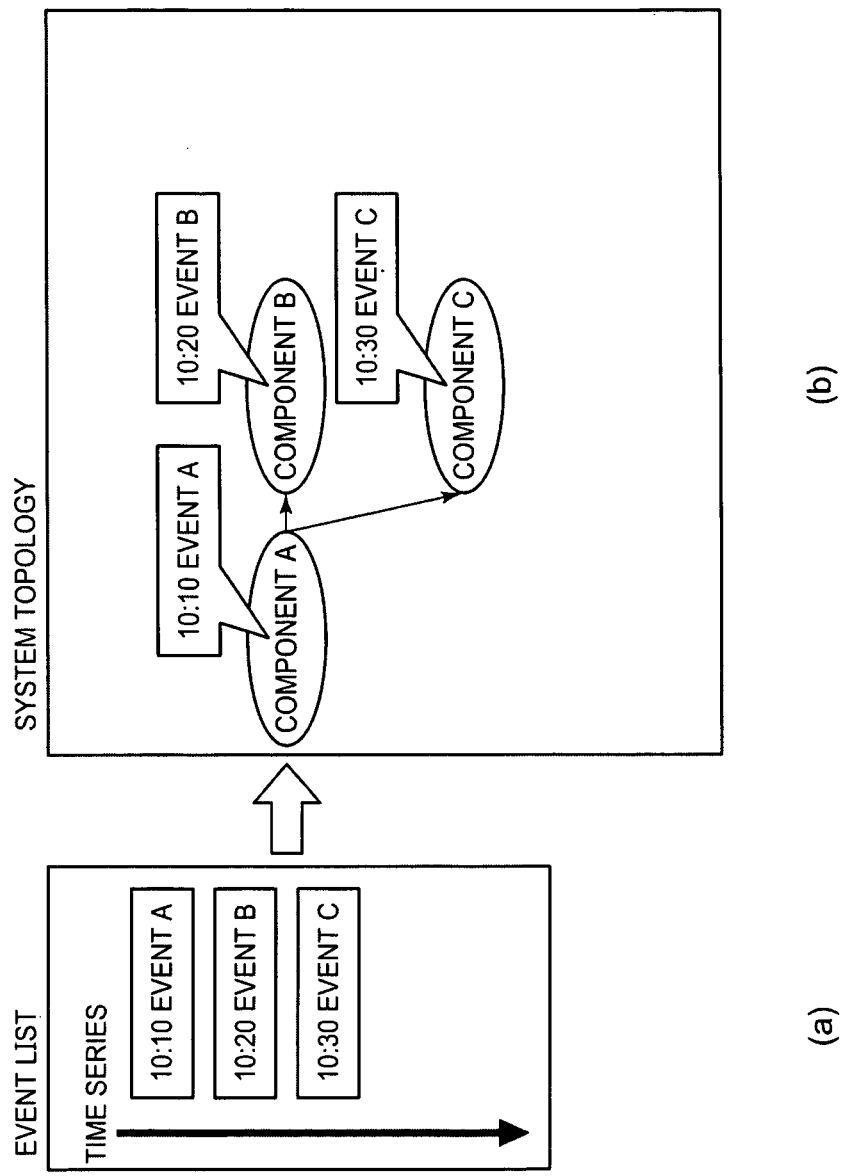
FIG. 22 illustrates a topology when the number of selected events is plural, the relationship among components is not the perfect serial relationship, and the selected events are different types.

As shown in FIG. 22, since different events A, B, and C (from component A) and components B and C (connected to component A and in a parallel relationship therewith) occurred at 10:10, 10:20, and 10:30, respectively, a sequence of events may be detected, even if they are in random order. Therefore, an unordered sequence pattern may be extracted as the detection rule.

Returning again to FIG. 13, if it is determined that the components are in a perfect serial relationship, the CPU 11 of the detection rule-generating apparatus 1 may then determine whether the selected events are the same kind. If yes, the CPU 11 may extract S1306 the ordered sequence pattern as the detection rule. It is, of course, understood that the threshold pattern or the unordered sequence pattern may be extracted in certain embodiments.

FIGS. 23(a) and 23(b) illustrate a topology when the number of selected events is plural, the relationship among components is a perfect serial relationship, and the selected events are the same kind. Specifically, FIG. 23(a) illustrates events including the event occurrence times. FIG. 23(b) illustrates a topology diagram including the event occurrence times.

Figure 23:
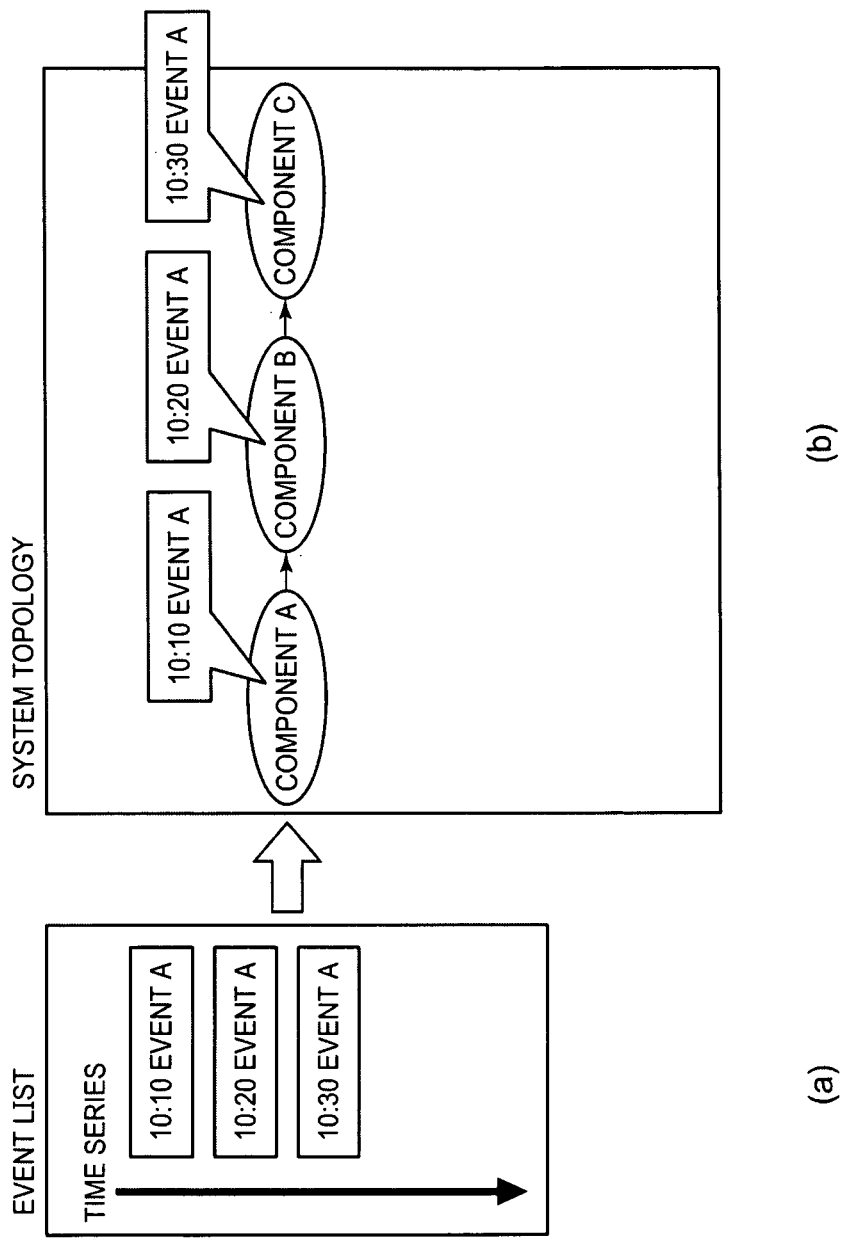
FIG. 23 illustrates a topology when the number of selected events is plural, the relationship among components is a perfect serial relationship, and the selected events are the same kind.

As shown in FIG. 23, since event A (from components A, B, and C in the serial relationship) occurred at 10:10, 10:20, and 10:30, respectively, a sequence of ordered events may be detected. Therefore, the ordered sequence pattern may be extracted as the detection rule.

Returning again to FIG. 13, if it is determined that the selected events are different kinds, the CPU 11 of the detection rule-generating apparatus 1 may extract S1307 a sequence pattern as the detection rule. In this case, either the ordered sequence pattern or the unordered sequence pattern may be extracted on a priority basis according to the presence or absence of ordering of selected events. However, since the components are in a perfect serial relationship, the ordered sequence pattern may be extracted.

FIGS. 24(a) and 24(b) illustrate a topology when the number of selected events is plural, the relationship among components is a perfect serial relationship, and the selected events are different kinds. Specifically, FIG. 24(a) illustrates events including the event occurrence times. FIG. 24(b) illustrates a topology diagram including the event occurrence times.

Figure 24:
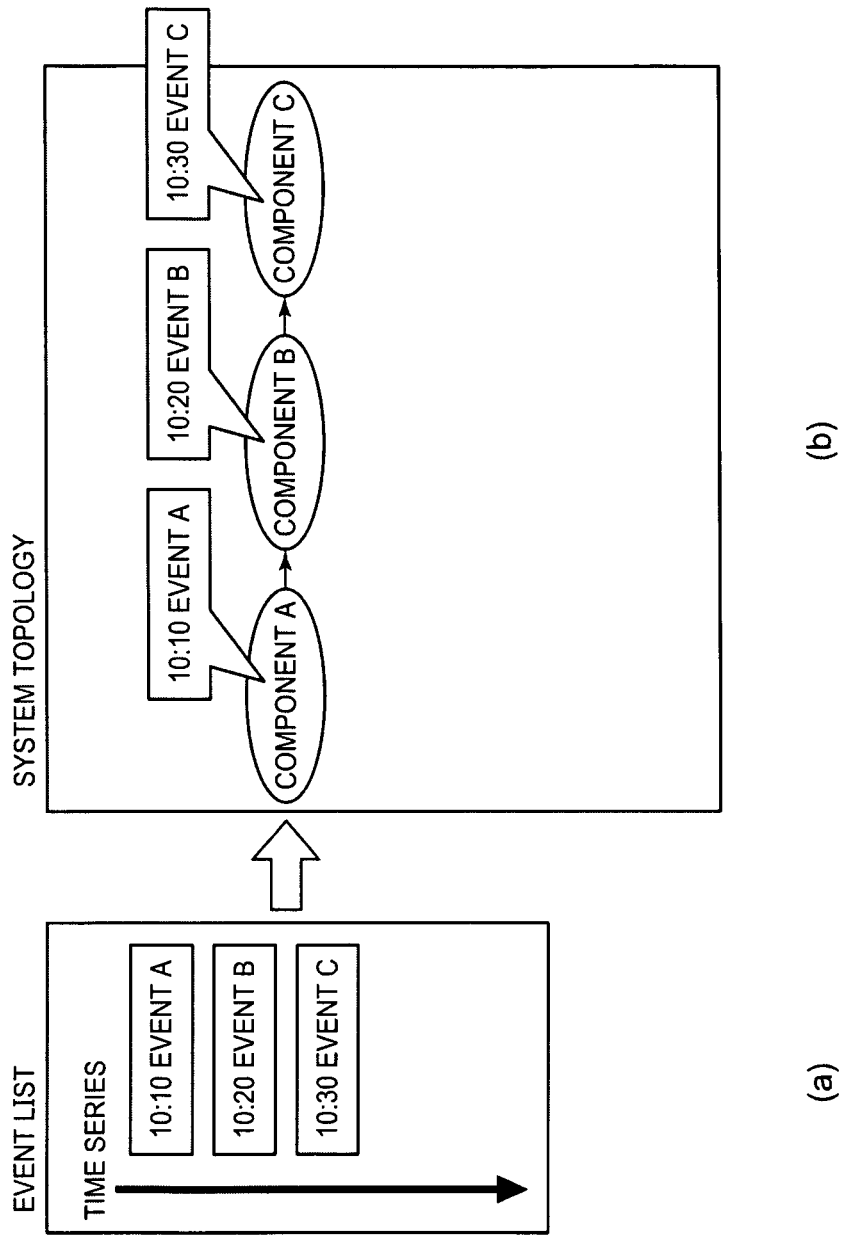
FIG. 24 illustrates a topology when the number of selected events is plural, the relationship among components is a perfect serial relationship, and the selected events are different types.

As shown in FIG. 24, since different events A, B, and C (from components A, B, and C in a serial relationship) occurred at 10:10, 10:20, and 10:30, respectively, a sequence of ordered events may be detected. Therefore, an ordered sequence pattern may be extracted as the detection rule.

As described above, since related information among components may be included in system configuration information, the detection rules for events causing failures may be generated to include not only the dependencies among components, but also the related information. Further, candidate events may be presented based on the detection rules to effectively support detection rule-generation work by a user, as well as to enable reliable generation of high-level detection rules without requiring a high degree of skill from the user.

The present invention is not limited to the aforementioned embodiment, and various changes and modifications are possible within the scope of the present invention. For example, the symptom database, the configuration information-storing section, and the history information-storing section may be included in the storage device of an external computer connected through a network to the detection rule-generating apparatus and read as necessary.

The invention claimed is:

1. An apparatus for generating event detection rules in a multiple-component computer system, the apparatus comprising:
    at least one processor;
    at least one memory device coupled to the at least one processor and storing instructions executable by the at least one processor, the instructions comprising:
        a configuration information-extracting section for acquiring system configuration information from a multiple-component computer system, the system configuration information describing relationships among system components;
        a history information-collecting section for collecting history information from the multiple-component computer system, the history information comprising at least one of log information and failure information output from a component upon occurrence of a system failure;
        a candidate event-identifying section for identifying candidate events for selection based on the system configuration information and the history information;
        a candidate event-presenting section for presenting the candidate events to a user and an event selection-accepting section for accepting selection of at least one candidate event;
        a detection rule-extracting section for extracting a detection rule according to a topology comprising at least one component associated with the at least one selected candidate event;
        a detection rule generating/storing section for generating and storing the detection rule; and
        a candidate event-detecting section for detecting the occurrence of the selected candidate events associated with the stored detection rule.

2. The apparatus of claim 1, further comprising:
a data format-converting section for converting at least one of the log information and the failure information into a unified data format prior to collection by the history information-collecting section.

3. The apparatus of claim 1, further comprising:
a detection rule-presenting section for presenting the detection rule; and
an update section for accepting an update to the detection rule and updating a database storing the detection rule.

4. The apparatus of claim 1, further comprising:
a quantity determination section for determining whether a number of selected candidate events is singular, wherein the detection rule-extracting section extracts the detection rule as a filter pattern if the number of selected candidate events is singular.

5. The apparatus of claim 4, further comprising:
a component determination section for, in response to determining that the number of selected candidate events is plural, determining whether a number of components that sent out the selected candidate events is singular; and
an event determination section for, in response to determining that the number of components is singular, determining whether the selected candidate events are of the same kind.

6. The apparatus of claim 5, wherein if the event determination section determines that the events are of the same kind, the detection rule-extracting section extracts the detection rule as a threshold pattern, and if the event determination section determines that the events are of different kinds, the detection rule-extracting section extracts the detection rule as a sequence pattern.

7. The apparatus of claim 5, further comprising:
a connection determination section for determining whether a plurality of components are connected in a topology in response to the component determination section determining that the number of components is plural; and
a parallel relationship-determining section for determining whether the plurality of components are in a parallel relationship if the connection determination section determines that the plurality of components are not connected, wherein the detection rule extracting section extracts the detection rule as the sequence pattern if the plurality of components are not in the parallel relationship.

8. The apparatus of claim 7, wherein the detection rule-extracting section extracts the detection rule as a threshold pattern if the parallel relationship-determining section determines that the plurality of components are in a parallel relationship and the event determination section determines that the selected candidate events are of the same kind, and the detection rule-extracting section extracts the detection rule as a sequence pattern if the event determination section determines that the selected candidate events are of different kinds.

9. The apparatus of claim 7, wherein the detection rule-extracting section extracts the detection rule as a sequence pattern if the connection determination section determines that the plurality of components are connected.

10. The apparatus of claim 7, further comprising:
a serial relationship-determining section for determining whether the plurality of components are in a serial relationship if the connection determination section determines that the plurality of components are connected.

11. The apparatus of claim 10, wherein the event determination section determines whether the selected candidate events are of the same kind in response to the serial relationship determining section determining that the plurality of components are not in a serial relationship.

12. The apparatus of claim 11, wherein the detection rule-extracting section extracts the detection rule as an ordered sequence pattern if the event determination section determines that the selected candidate events are of the same kind.

13. The apparatus of claim 11, wherein the detection rule-extracting section extracts the detection rule as an unordered sequence pattern if the event determination section determines that the selected candidate events are of different kinds.

14. The apparatus of claim 11, wherein the detection rule-extracting section extracts the detection rule as an ordered sequence pattern if the serial relationship-determining section determines that the plurality of components are in a serial relationship.

15. A method for generating event detection rules in a multiple-component system, the method comprising:
acquiring system configuration information from a multiple-component system, the system configuration information describing relationships among system components;
collecting history information from the multiple-component system, the history information comprising at least one of log information and failure information output from a component upon occurrence of a system failure;
identifying candidate events for selection based on the system configuration information and the history information;
presenting the identified candidate events to a user and accepting selection of at least one candidate event;
extracting a detection rule according to a topology comprising at least one component associated with the at least one selected candidate event;
generating and storing the detection rule; and
detecting the occurrence of the selected candidate events associated with the stored detection rule.

16. The method of claim 15, further comprising:
converting at least one of the log information and the failure information into a unified data format; and
collecting at least one of the log information and the failure information in the unified data format.

17. The method of claim 15, further comprising:
presenting the extracted detection rule to a user.

18. The method of claim 17, further comprising:
determining whether a number of selected candidate events is singular, wherein extracting the detection rule comprises extracting the detection rule as a filter pattern if the number of events is singular.

19. A computer program product for generating event detection rules in a multiple-component computer system, the computer program product comprising:
a non-transitory computer-readable storage medium having computer-usable program code stored therein, the computer-usable program code comprising:
computer-usable program code for acquiring system configuration information from a multiple-component system, the system configuration information describing relationships among system components;
computer-usable program code for collecting history information from the multiple-component system, the history information comprising at least one of log information and failure information output from a component upon occurrence of a system failure;
computer-usable program code for identifying candidate events for selection based on the system configuration information and the history information;

computer-usable program code for presenting the identified candidate events to a user and accepting selection of at least one candidate event;

computer-usable program code for extracting a detection rule according to a topology comprising at least one component associated with the at least one selected candidate event;

computer-usable program code for generating and storing the detection rule; and computer-usable program code for detecting the occurrence of the selected candidate events associated with the stored detection rule.

\* \* \* \* \*